United States Patent [19]

Ishizuka et al.

[11] Patent Number: 5,325,186
[45] Date of Patent: Jun. 28, 1994

[54] MOTION ADAPTIVE LUMINANCE SIGNAL AND COLOR SIGNAL SEPARATING FILTER

[75] Inventors: Mitsuru Ishizuka; Noriyuki Yamaguchi, both of Nagaokakyo, Japan

[73] Assignee: Mitsubishi Denki Kabushiki Kaisha, Tokyo, Japan

[21] Appl. No.: 941,154

[22] Filed: Sep. 4, 1992

Related U.S. Application Data

[62] Division of Ser. No. 597,670, Oct. 12, 1990, Pat. No. 5,146,318.

[30] Foreign Application Priority Data

Oct. 14, 1989 [JP] Japan .................................. 1-267132
Oct. 19, 1989 [JP] Japan .................................. 1-274391

[51] Int. Cl.[5] ............................................. H04N 9/78
[52] U.S. Cl. ............................ 348/663; 348/669
[58] Field of Search ............. 358/31, 105; H04N 9/78

[56] References Cited

U.S. PATENT DOCUMENTS

| | | | |
|---|---|---|---|
| 4,597,007 | 6/1986 | Reitmeier et al. ................. | 358/31 |
| 4,598,309 | 7/1986 | Casey ............................... | 358/31 |
| 4,636,840 | 1/1987 | McNeely et al. .................. | 358/31 |
| 4,870,482 | 9/1989 | Yasuki et al. ..................... | 358/31 |
| 4,930,012 | 5/1990 | Fujita ............................... | 358/31 |
| 4,972,259 | 11/1990 | Motoe et al. ..................... | 358/31 |
| 4,994,900 | 2/1991 | Ebara et al. ...................... | 358/31 |
| 5,023,713 | 7/1991 | Nishigori ......................... | 358/31 |

FOREIGN PATENT DOCUMENTS

| | | | |
|---|---|---|---|
| 0153034 | 8/1985 | European Pat. Off. ....... | H04N 9/78 |
| 77782 | 4/1984 | Japan ............................ | H04N 9/38 |
| 173881 | 7/1987 | Japan ............................ | H04N 9/78 |
| 187894 | 3/1988 | Japan ............................ | H04N 9/78 |

Primary Examiner—James J. Groody
Assistant Examiner—Glenton B. Burgess

[57] ABSTRACT

A filter for separating a color signal and a luminance signal from a composite color television signal in which the frequency of said color signal is multiplexed in a high-frequency region of the luminance signal. In response to the movement of a picture, an appropriate filter is selected from a filter utilizing interframe correlation, a filter utilizing interfield correlation and a filter utilizing the infield correlation. A plurality of filters utilizing filed correlation are prepared and a color signal and a luminance signal are separated by the processing of a principal pixel, which is an object of processing, and pixels different from each other. A filter is selected in accordance with the correlation state between the principal pixel and the pixels therearound.

41 Claims, 17 Drawing Sheets

MOTION ADAPTIVE LUMINANCE SIGNAL AND COLOR SIGNAL SEPARATING FILTER

This application is a divisional of copending application Ser. No. 07/597,670, filed on Oct. 12, 1990, now U.S. Pat. No. 5,146,318. The entire contents of which are hereby incorporated by reference.

BACKGROUND OF THE INVENTION

1. Field of the Invention

The present invention relates to a luminance signal and color signal separating filter and, more particularly, to a motion adaptive luminance signal and color signal separating filter for separating a luminance signal (hereinunder referred to as "Y signal" or "Y") and a color signal (hereinunder referred to as "C signal" or "C") from a composite color television signal (hereinunder referred to as "V signal") in which the frequency of a C signal is multiplexed in a high-frequency region of a Y signal.

The motion adaptive YC separating filter is a filter which executes YC separation suitable to the pixel signal at each part while locally judging whether the picture is a still picture or a motion picture.

2. Description of the Related Art

In the current NTSC system, the frequency of a C signal is multiplexed in a high-frequency region of a Y signal in a V signal. YC separation is therefore necessary in a television set. Further if the separation is insufficient, a deterioration in the picture quality such as cross color and dot crawl is caused.

Various signal processing circuits for improving the picture quality have hitherto been proposed. One example of them is a motion adaptive YC separating filter which utilizes a delay circuit having a delay time equal to or greater than the vertical scanning frequency of a television signal.

FIG. 12 is a block diagram showing an example of the structure of a conventional motion adaptive YC separating filter. In FIG. 12, a V signal 101 of an NTSC system is input from an input terminal 1, and a Y signal and a C signal are output from output terminals 2 and 3, respectively. The V signal 101 is also supplied to the input terminals of an infield YC separating circuit 4, interframe YC separating circuit 5, Y signal movement detecting circuit 6 and a C signal movement detecting circuit 7.

An infield separated Y signal (hereinunder referred to as "Yf signal") 102 and an infield separated C signal (hereinunder referred to as "Cf signal") 103 which are separated from each other by an infield filter (not shown) of the infield YC separating circuit 4 are input to a first input terminal of a Y signal mixer 9 and a first input terminal of a C signal mixer 10, respectively.

An interframe separated Y signal (hereinunder referred to as "YF signal") 104 and an inter frame separated C signal (hereinunder referred to as "CF signal") 105 which are separated from each other by an interframe filter (not shown) of the interframe YC separating circuit 5 are input to a second input terminal of the Y signal mixer 9 and a second input terminal of the C signal mixer 10, respectively.

A synthesizer 8 synthesizes a signal 106 of amount of Y signal movement which is detected by the Y signal movement detecting circuit 6 and input to one input terminal of the synthesizer 8 and a signal 107 of amount of C signal movement which is detected by the C signal movement detecting circuit 7 and input to the other input terminal of the synthesizer 8. A movement detecting signal 108 obtained by the synthesis of the signals 106 and 107 by the synthesizer 8 is input to a third input terminal of the Y signal mixer 9 and a third input terminal of the C signal mixer 10.

The Y signal movement detecting circuit 6 the C signal movement detecting circuit 7 and the synthesizer 8 constitute a movement detecting circuit 92.

A motion adaptive separated Y signal 109 which is output from the Y signal mixer 9 is supplied from the output terminal 2. Further and a motion adaptive separated C signal 110 which is output from the C signal mixer 10 is supplied from the output terminal 3.

The operation of the YC separating circuit having the above-described structure will now be explained.

The movement detecting circuit 92 synthesizes the outputs of the Y signal movement detecting circuit 6 and the C signal movement detecting circuit 7 by the synthesizer 8 and judges whether the V signal 101 is a signal indicating a still picture, or a signal indicating a motion picture before separating the Y signal and the C signal from the input V signal 101.

FIG. 15 is a block diagram showing an example of the structure of the Y signal movement detecting circuit 8. A difference between the V signal 101 which is input from a terminal 73 and a V signal delayed by 1 frame is obtained by a 1-frame delay circuit 75 and a subtracter. Then, and after the difference signal is passed through a low pass filter (hereinunder referred to as "LPF") 77, the absolute value of the difference signal is obtained by an absolute value circuit 78. The absolute value is converted into the signal 106 showing the amount of movement of the low frequency component of a Y sisal by a nonlinear converter. The converted signal is then output to a terminal 74.

FIG. 13 is a block diagram showing an example of the structure of the C signal movement detecting circuit 7. A difference between the V signal 101 which is input from the terminal 61 and a V signal delayed by 2 frames is obtained by a 2-frame delay circuit 64 and a subtracter 65, then after the difference signal is passed through a band pass filter (hereinunder referred to as "BPF") 66, the absolute value of the difference signal is obtained by an absolute value circuit 67. The absolute value is converted into the signal 107 showing the amount of movement of a C signal by a nonlinear converter 68 and the converted signal is output to a terminal 62.

The synthesizer 8 selects the larger value from the signal 106 of amount of Y signal movement and the signal 107 of amount of C signal movement and outputs the selected signal.

The result of judgement is represented in the form of a movement coefficient ($0 \leq k \leq 1$) and is supplied to the Y signal mixer 9 and the C signal mixer 10 as a control signal 108. For example, when the picture is judged to be a still picture, $k=0$, and when the picture is judged to be a complete motion picture, $k=1$.

Generally, when the picture is a still picture, the Y signal is separated from the C signal by the interframe YC separation utilizing interframe correlation.

FIG. 16 is a block diagram showing an example of the detailed structure of the interframe YC separating circuit 5. A sum of the V signal 101 which is input from a terminal 80 and a V signal delayed by 1 frame is obtained by a 1-frame delay circuit 83 and an adder 84. The YF signal 104 is extracted and output to a terminal 81 and simultaneously the CF signal 105 extracted by subtracting the YF signal 104 from the input V signal 101 is output to a terminal 82.

Generally, when the picture is a motion picture, the Y signal is separated from the C signal by the infield YC separation utilizing infield correlation.

FIG. 17 is a block diagram showing an example of the detailed structure of the infield YC separating circuit 4. A sum of the V signal 101 which is input from a terminal 86 and a V signal delayed by 1 line is obtained by a 1-line delay circuit 89 and an adder 90. The Yf signal 102 is extracted and output to a terminal 87 and simultaneously the Cf signal 103 extracted by subtracting the Yf signal 102 from the input V signal 101 is output to a terminal 88.

As described above, the motion adaptive YC separating filter is provided with the infield YC separating circuit 4 and the interframe YC separating circuit 5 disposed in parallel to each other, and outputs the motion adaptive separated Y signal 109 obtained from the Y signal mixer 9 which executes the following calculation on the basis of the movement coefficient k synthesized by the synthesizer 8:

$$Y = kYf + (1-k)YF$$

wherein
Yf: the infield separated Y signal output 102
YF: the interframe separated Y signal output 104.

In the same way, the motion adaptive separated C signal 110 obtained from the C signal mixer 10 which executes the following calculation on the basis of the control signal 108 is output:

$$C = kCf + (1-k)CF$$

wherein
Cf: the infield separated C signal output 103
CF: the interframe separated C signal output 105.

The motion adaptive separated Y signal 109 and the motion adaptive separated C signal 110 are supplied from the output terminal 2 and 3, respectively.

The C signal movement detecting circuit 7 of such a motion adaptive YC separating filter may also have the structure shown in FIG. 14.

In FIG. 14, the V signal 101 input from the input terminal 61 is demodulated into two kinds of color difference signals R-Y and B-Y by a color demodulator 69. These color difference signals R-Y and B-Y are time-division multiplexed at a certain frequency by a time division multiplexer 70 and a difference between the V signal 101 and a V signal delayed by 2 frames is obtained by the 2-frame delay circuit 64 and the subtracter 65. The thus-obtained difference is passed through an LPF 71 so as to remove the Y signal component, and the absolute value is obtained by the absolute value circuit 67. The thus-obtained absolute value is nolinearly converted by the nonlinear converter 68 and the signal 107 of amount of C signal movement is supplied from the output terminal 62.

The conventional motion adaptive YC separating filter having the above-described structure mixes the Yf signal and the Cf signal obtained by the infield YC separation and the YF signal and the CF signal obtained by the interframe YC separation, respectively, on the basis of the amount of movement detected by the Y signal movement detecting circuit and synthesized with the amount of movement detected by the C signal movement detecting circuit. As a result, the filter characteristic in a still picture and the filter characteristic in a motion picture are completely different from each other. Thus when a picture is shifted from a still picture to a motion picture or from a motion picture to a still picture, there is an extreme change in resolution. This leads to a remarkable deterioration in the picture quality.

SUMMARY OF THE INVENTION

Accordingly, it is an object of the present invention to eliminate the above-described problems in the related art and to provide a motion adaptive YC separating filter which is capable of YC separation enabling a picture to be reproduced with a high resolution and only a slight degree of deterioration in the picture quality even when there is much switching between a still picture and a motion picture.

To achieve this aim, a motion adaptive YC separating filter according to the present invention has a structure which locally detects the movement of a picture by utilizing the correlation between frames by a detecting circuit and when the picture is a motion picture, the correlation in a field or between fields is further locally detected so that when the correlation between the fields is large, YC separation is carried out by an interfield YC processing. Further when there is no correlation between the fields, YC separation is carried out by an infield processing it further responsively controls the output of the inframe separating filter and the output of an interframe separating filter for carrying out the YC separation of a still picture.

According to the present invention, a motion adaptive YC separating filter constantly enables the optimum YC separation of a motion picture by utilizing the correlation of the picture, thereby enabling YC separation of a motion picture even in a switching process between a still picture and a motion picture only with a slight degree of deterioration in the picture quality such as cross color and cross luminance and with a high resolution. Thus, it is possible to reproduce a picture having a good quality as a whole.

The above and other objects, features and advantages of the present invention will become clear from the following description of the preferred embodiments thereof, taken in conjunction with the accompanying drawings.

DESCRIPTION OF THE PREFERRED EMBODIMENTS

An embodiment of the present invention will be explained hereinafter with reference to the accompanying drawings.

Figure 1:
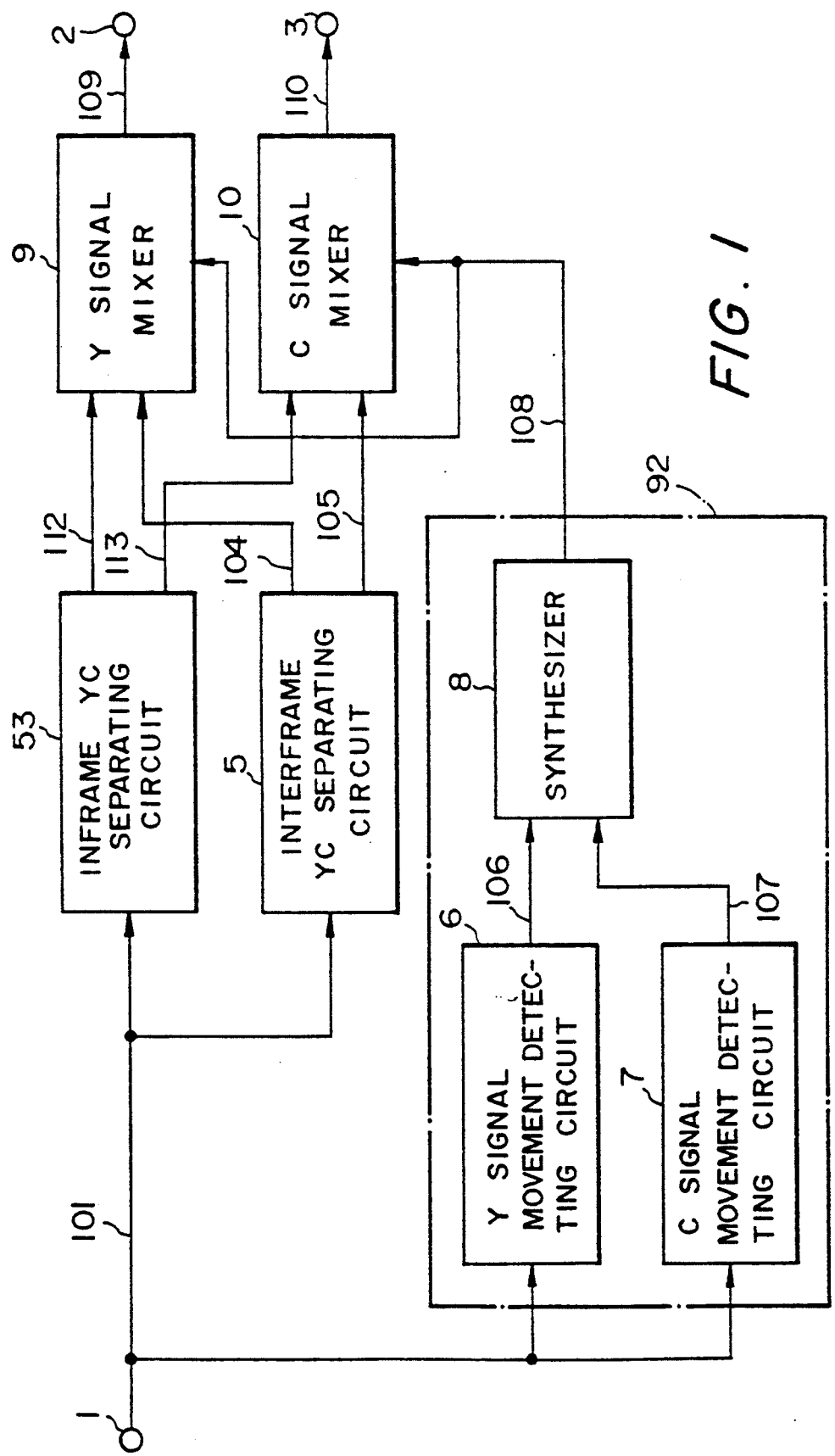
FIG. 1 is a block diagram of the structure of an embodiment of a motion adaptive YC separating filter according to the present invention.
Figure 12:
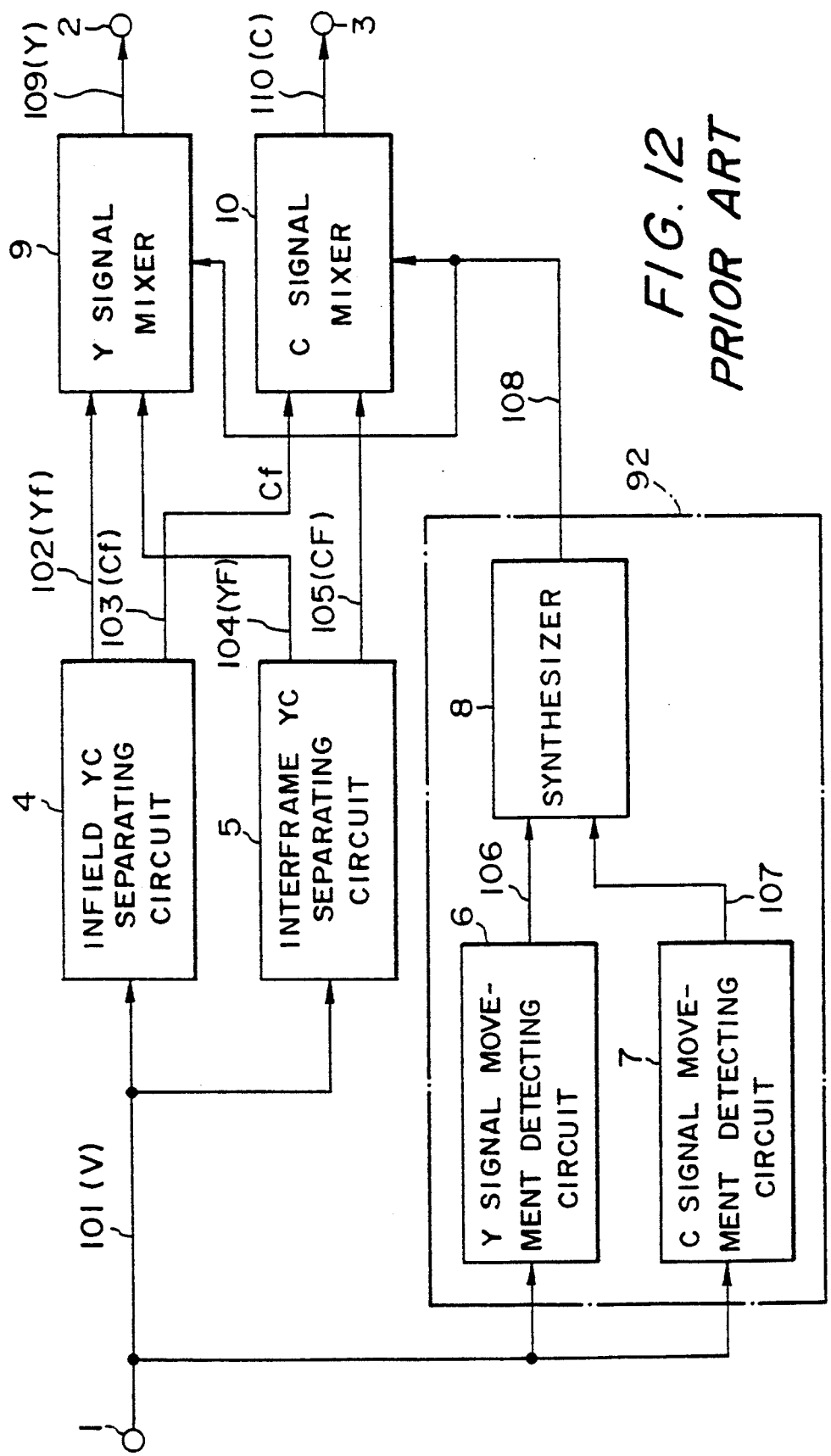
FIG. 12 is a block diagram of an example of a structure of a conventional motion adaptive YC separating filter.
Figure 13:
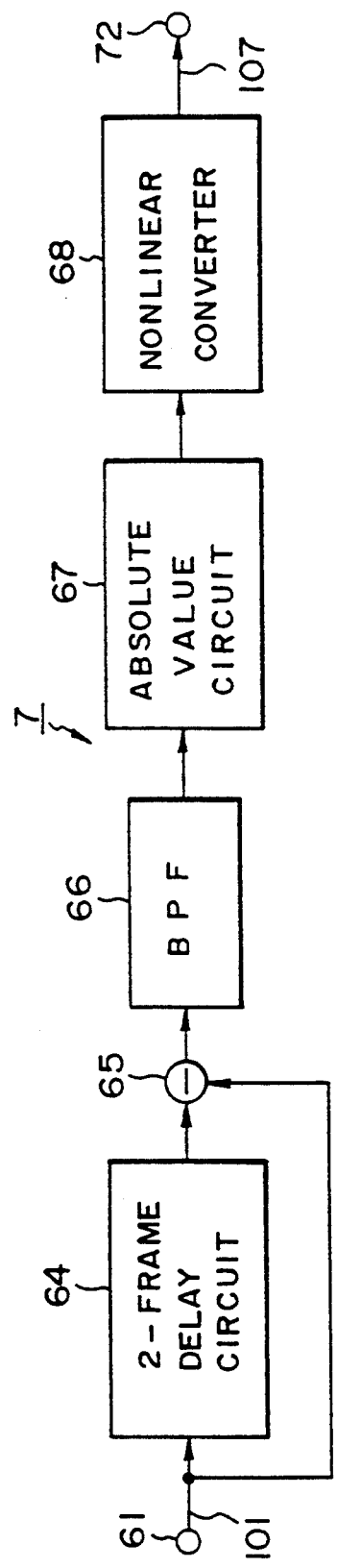
FIG. 13 is a block diagram of an example of a structure of a conventional C signal movement detecting circuit.
Figure 15:
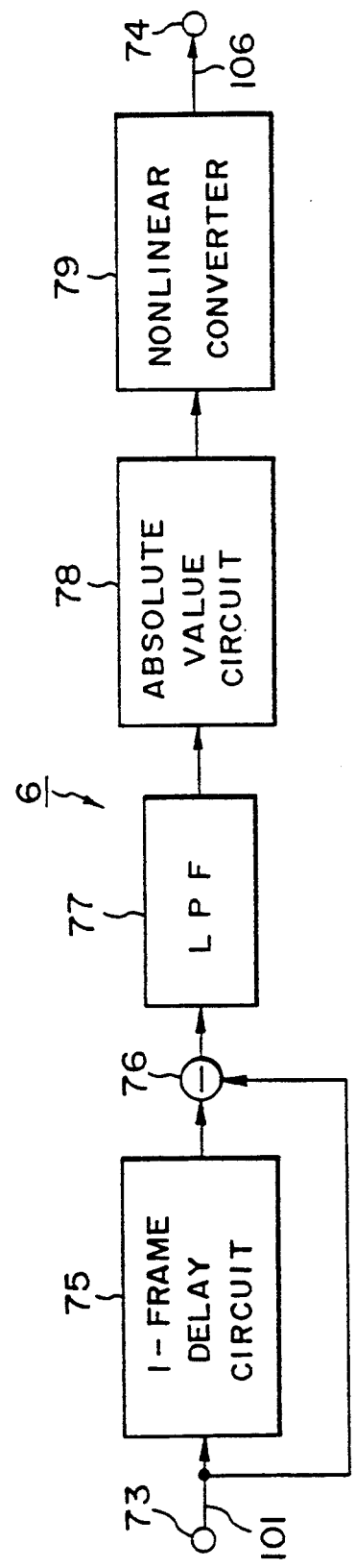
FIG. 15 is a block diagram of an example of a structure of a conventional Y signal movement detecting circuit.
Figure 14:
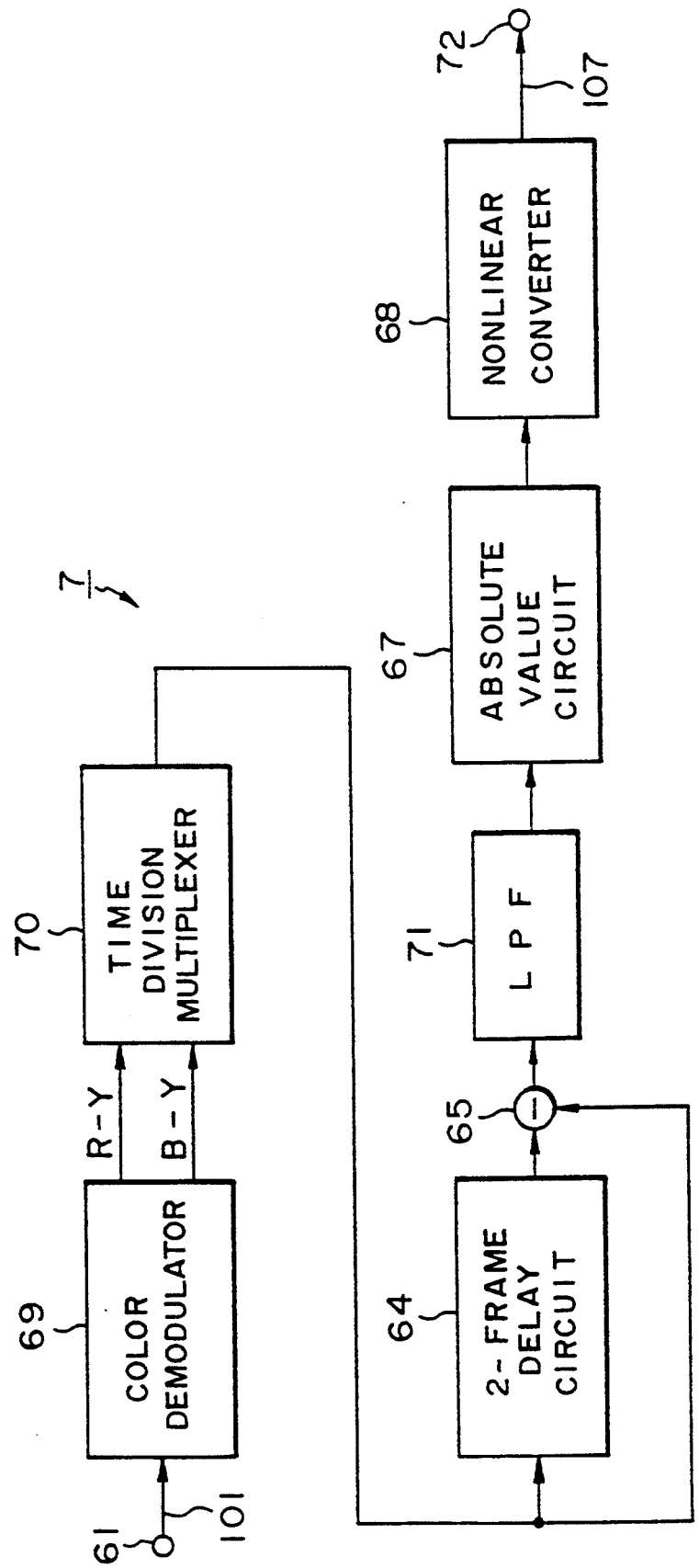
FIG. 14 is a block diagram of another example of a structure of a conventional C signal movement detecting circuit.
Figure 16:
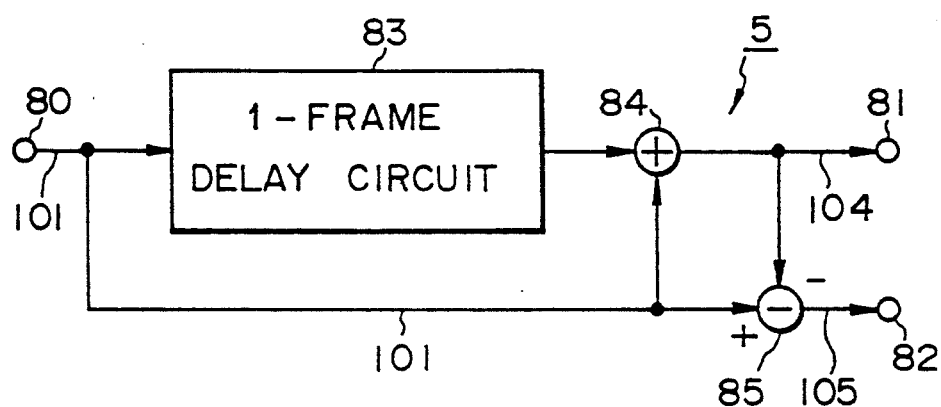
FIG. 16 is a block diagram of an example of the detailed structure of the interframe YC separating circuit shown in FIG. 12.
Figure 17:
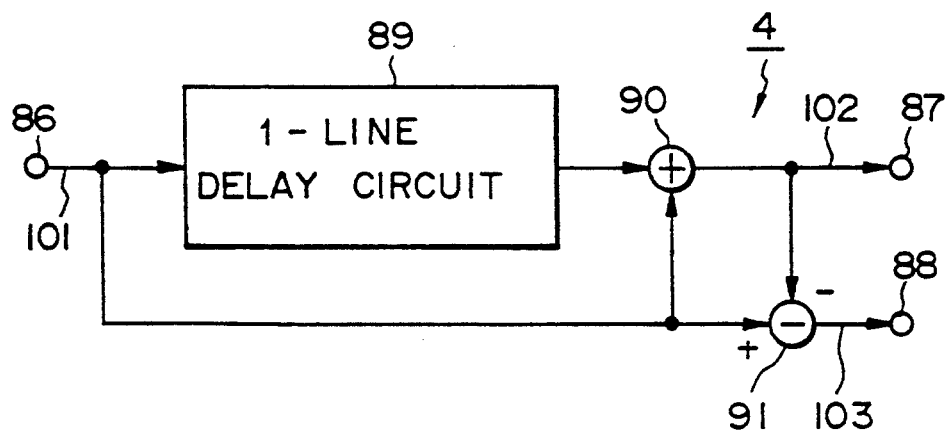
FIG. 17 is a block diagram of an example of the detailed structure of the infield YC separating circuit shown in FIG. 12.

FIG. 1 is a block diagram of the structure of an embodiment of a motion adaptive YC separating filter according to the present invention. This embodiment is different from the conventional filter shown in FIG. 12 in that the infield YC separating circuit 4 is replaced by an inframe YC separating circuit 53. Further although the correlation between frames is utilized in processing a still picture in the same way as in the related art, the processing of a motion picture is different. Since the other structure is the same, the same reference numerals are provide for the corresponding elements and detailed explanation thereof will be explained. Since the operation is also the same, explanation thereof will also be omitted.

Additionally, when the value of k, which is the output of the synthesizer 8 is 0 or 1, the Y signal mixer 9 and the C signal mixer 10 are operated as switching selecting circuits for the signals from the inframe YC separating circuit 53 and the interframe YC separating circuit 5, respectively.

Figure 2:
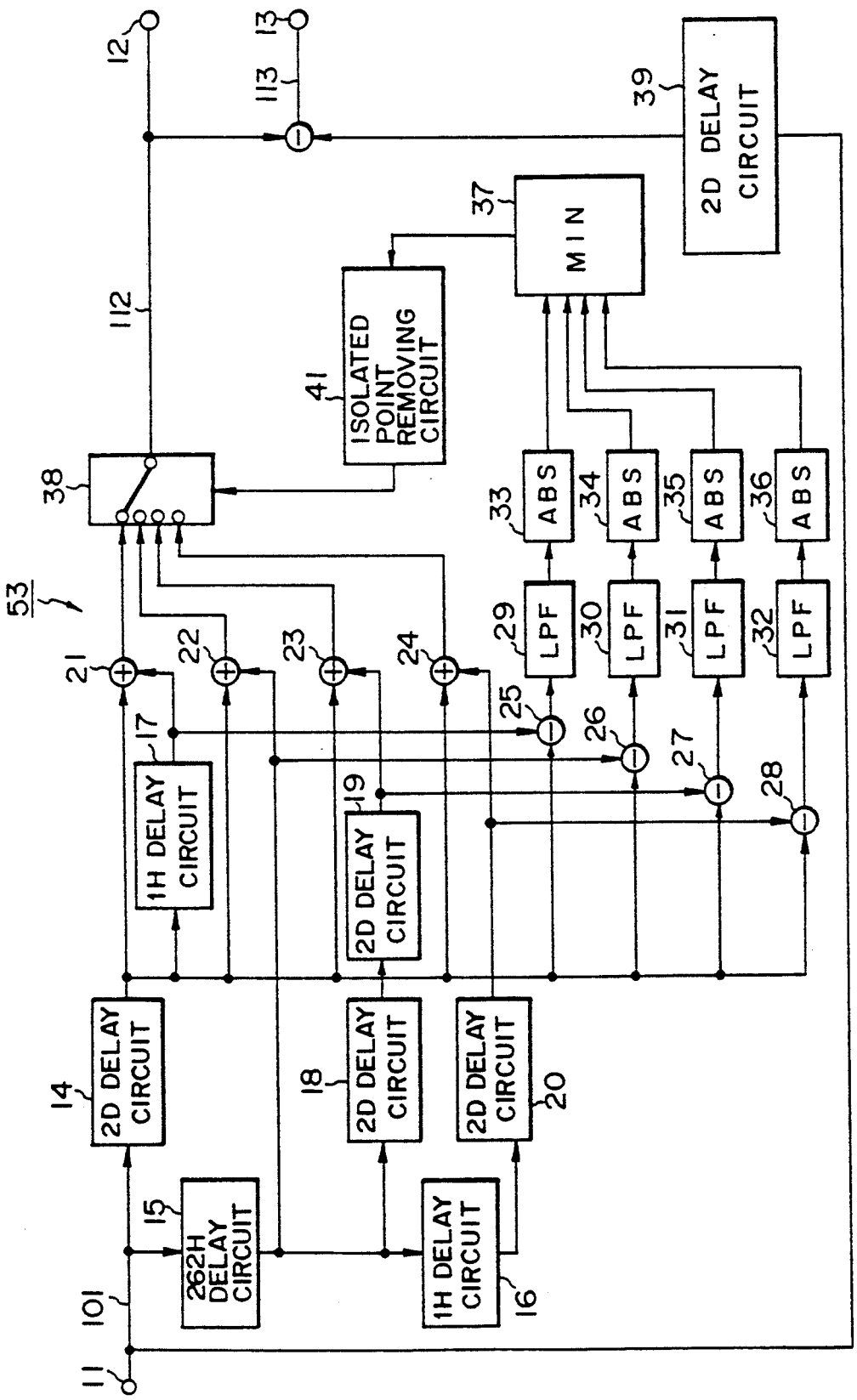
FIG. 2 is a block diagram of the detailed structure of an inframe YC separating circuit of the embodiment.

FIG. 2 is a block diagram of an example of the detailed structure of the inframe YC separating circuit 53. In FIG. 2, the V signal 101 is input to an input terminal 11. The inframe YC separating circuit 53 is provided with a 262-line delay circuit (hereinunder referred to as "262H delay circuit") 15, two-pixel delay circuits (hereinunder referred to as "2D delay circuit") 14, 18, 19, 20 and 39, and 1-line delay circuits (hereinunder referred to as "1H-delay circuit") 16 and 17.

The reference numerals 21, 22, 23 and 24 represent adders, 25, 26, 27, 28 and 40 subtracters, 29, 30, 31 and 32 LPF's, 33, 34, 35 and 36 absolute circuits (hereinunder referred to as "ABS"), 37 a minimum value selecting circuit (hereinunder referred to as "MIN"), 41 an isolated point removing circuit, and 38 a signal selecting circuit. The output of the signal selecting circuit 38 is output from an output terminal 12 as an inframe separated Y signal 112, and the output of the subtracter 40 is output from an output terminal 13 as an inframe separated C signal 113.

Figure 3:
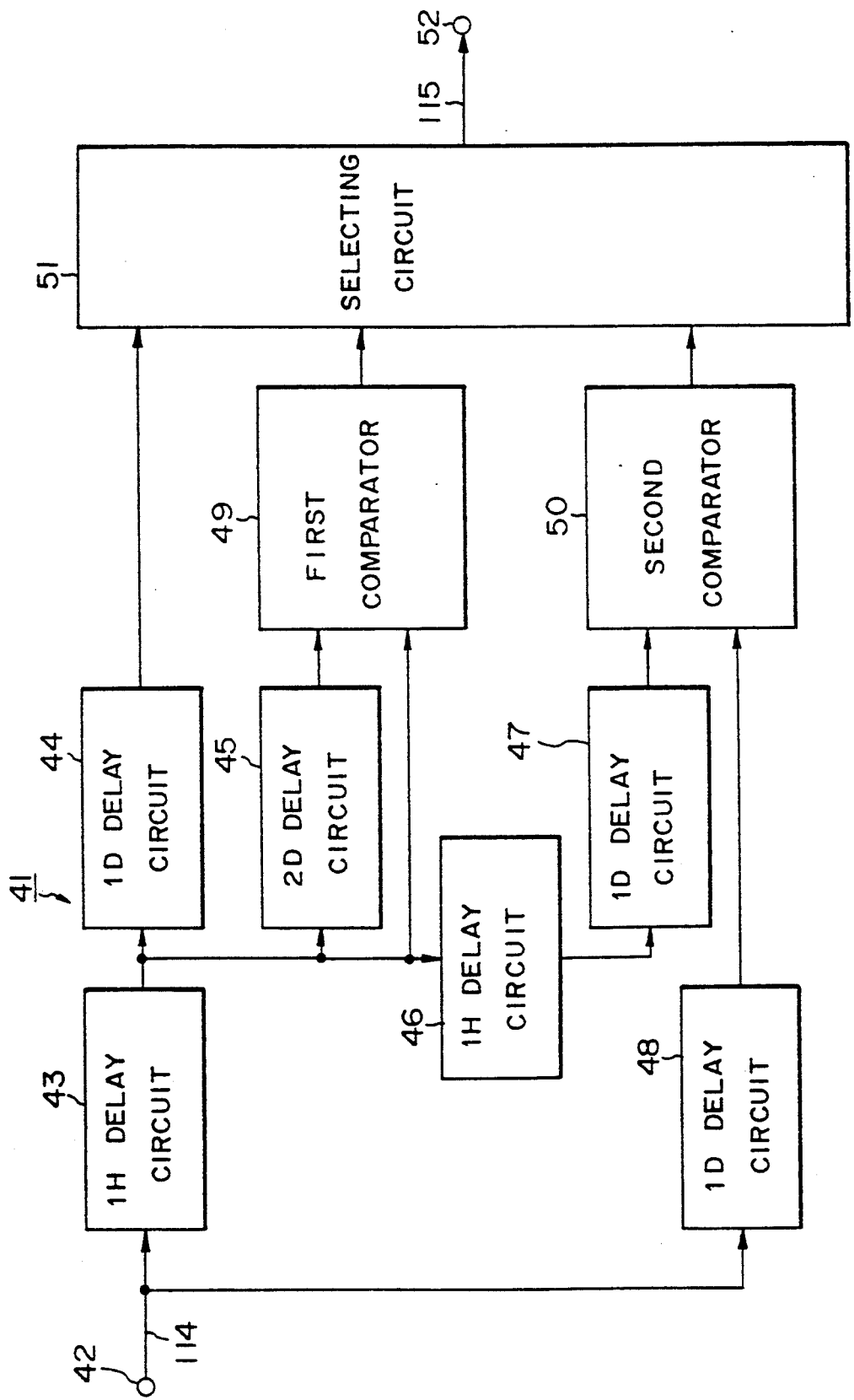
FIG. 3 is a block diagram of the detailed structure of an isolated point removing circuit of the embodiment.

FIG. 3 is a block diagram of the detailed structure of the isolated point removing circuit 41. In FIG. 3, a correlation detecting signal 114 input from an input terminal 42 is input to the 1H delay circuit 43 and the 1D delay circuit 48. The output of the 1H delay circuit 43 is input to one terminal of each of a 1D delay circuit 44, a 2D delay circuit 45 and a first comparator 49 and a 1H delay circuit 46. The output of the 2D delay circuit 45 is input to the other terminal of the first comparator 49.

The output of the 1H delay circuit 46 is input to one terminal of a second comparator 50 through a 1D delay circuit 47, and the output of the 1D delay circuit 48 is input to the other terminal of the second comparator 50.

The output of the 1D delay circuit 44 and the outputs of the first and second comparators 49 and 50 are input to a selecting circuit 51, and the selecting circuit 51 outputs a control signal 115 to an output terminal 52.

Before explaining the operation of the inframe YC separating circuit 53 having the structure shown in FIG. 2, the fundamental principle of the motion adaptive YC separation will be explained.

Figure 4A:
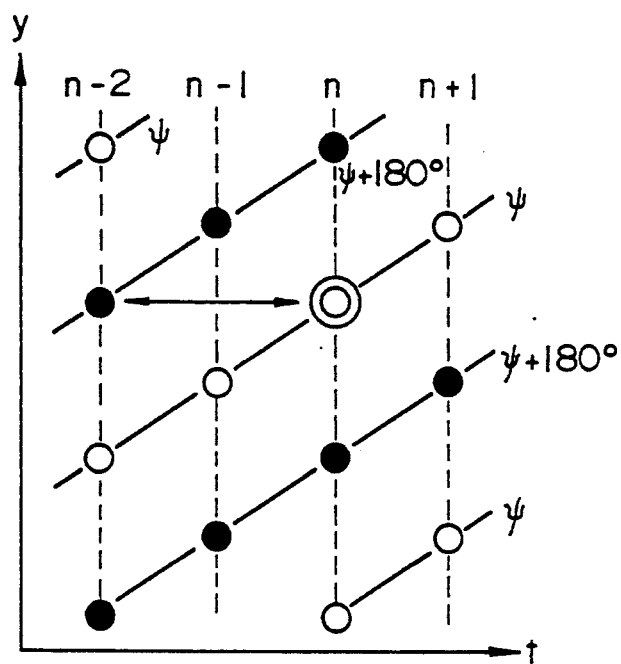
FIGS. 4(A), 4(B) and 4(C) show the arrangement of a V signal digitally converted at a frequency four times as high as that of a chrominance subcarrier in a three-dimensional time space.
Figure 4B:
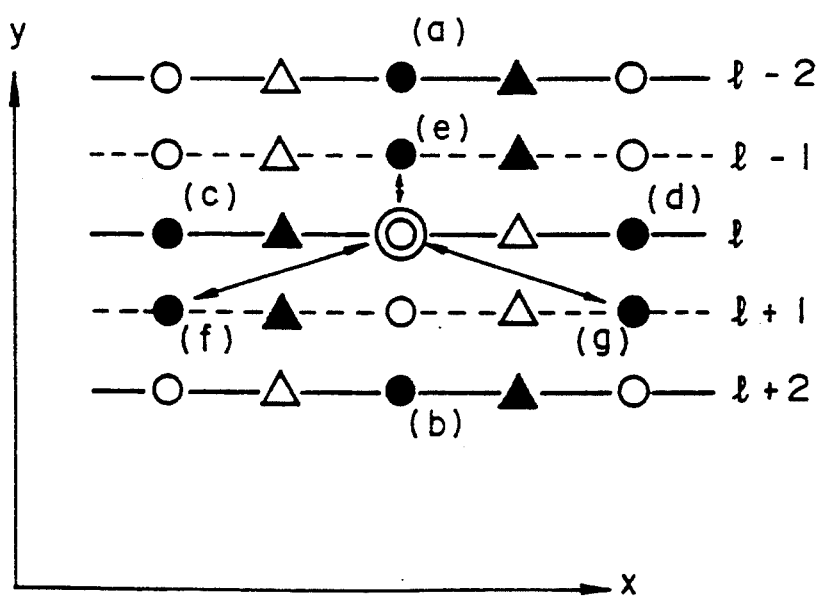
Figure 4C:
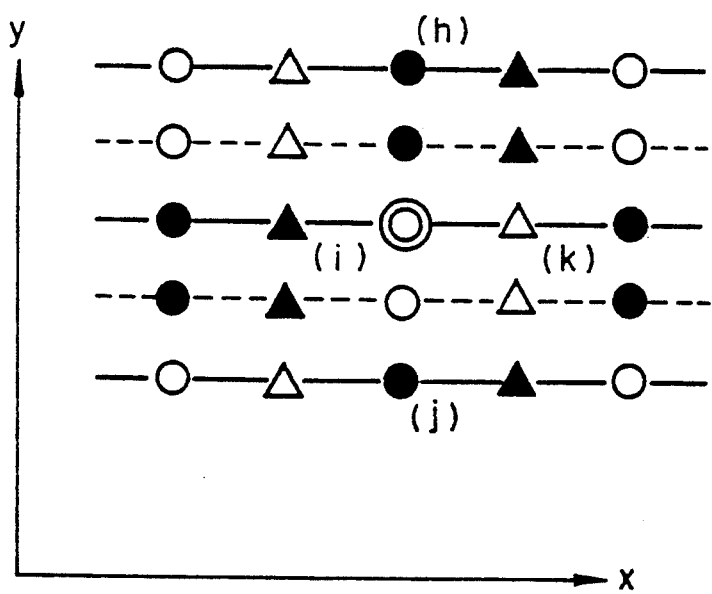

FIGS. 4(A) to 4(C) show the arrangement of the V signal digitally converted at a frequency 4 times as high as that of a chrominance subcarrier in a three-dimensional time space. If it is assumed that the horizontal direction in the drawing is the x axis, the direction perpendicular to the drawing is the y axis, and the direction perpendicular to the plane constituted by the x axis and the y axis is the t axis, FIG. 4(A) shows the plane constituted by the t axis and the y axis in the three-dimensional time space, and FIGS. 4(B) and 4(C) show the plane constituted by the x axis and the y axis.

A broken line in FIG. 4(A) represents one field in which interlace scanning is carried out. A solid line indicates that the chrominance subcarrier is in the same phase. A solid line and a broken line in FIG. 4(B) represent scanning lines in the n field and the (n−1) field, respectively. A solid line and a broken line in FIG. 4(C) represent scanning lines of the (n+1) field and the n field, respectively.

The four kinds of marks O, ●, ∆ and ▲ on each scanning line represents the sampling points of the chrominance subcarrier in the same phase when the V signal is digitally converted at a frequency four times as high as the frequency fsc (=3.58 MZ) of the chrominance subcarrier.

In FIG. 4(B), the mark ⊙ represents the principal sampling point. The phase $\Psi$ of the chrominance subcarrier is 180° different at the four points (a), (b), (c) and (d) which are before and after two sampling points in the n field, which is the same field as the field for the sampling point O, and one line above and below the sampling point O, respectively. Therefore, it is possible to constitute a line comb filter or an adaptive YC separating filter such as that shown in Japanese Patent Laid-Open No. 242367 (1983) by the digital circuit.

It is also possible to constitute an interframe YC separating filter by the digital circuit, because the phase of the chrominance subcarrier is 180° different at the same sampling points which are one frame apart from each other, as shown in FIG. 4(A). Furthermore, in the (n−1) field, which is one field before the principal sampling point, the phase $\Psi$ of the chrominance subcarrier is reverse at the sampling point (e), which is one line above and the sampling points (f) and (g), which are one line below, as shown in FIG. 4(B). Therefore, interfield YC separation is enabled between the principal sampling point and any of these three points (a), (b) and (c).

Figure 5A:
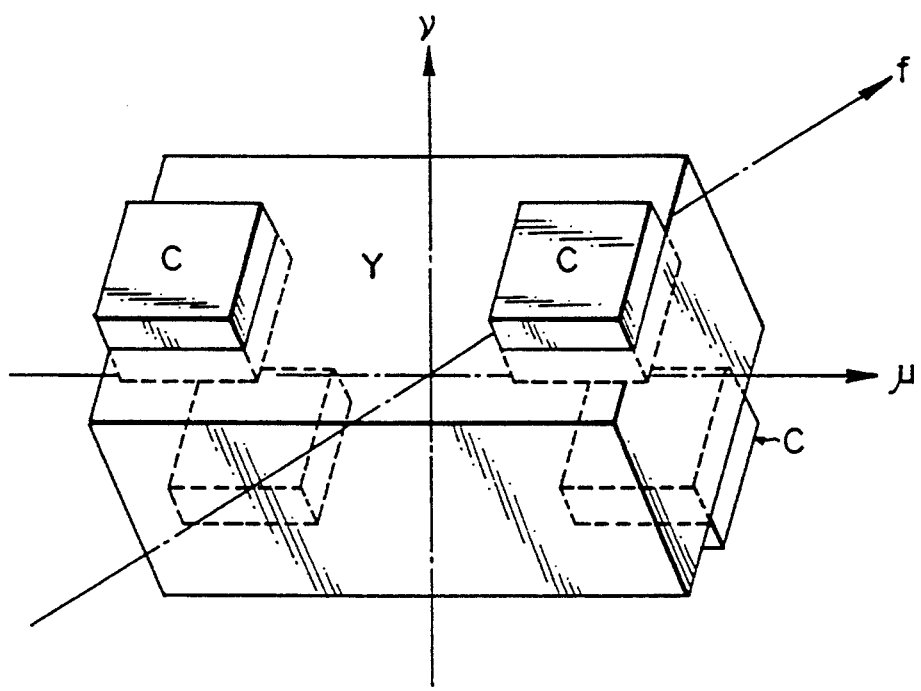
FIGS. 5(A), 5(B) and 5(C) show the spectrum distribution of a V signal in a three-dimensional frequency space.
Figure 5B:
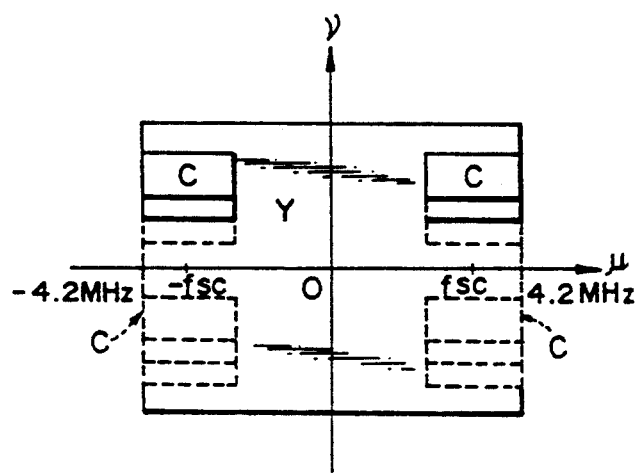
Figure 5C:
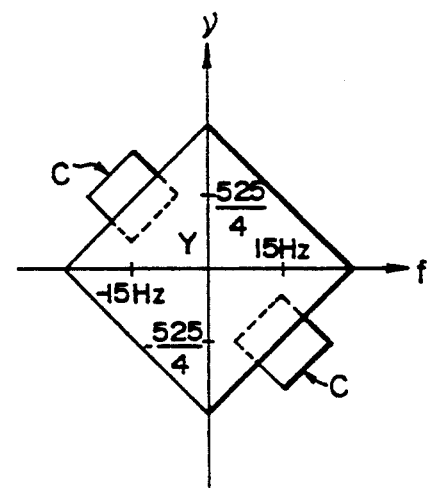

FIGS. 5(A) to 5(C) are projection charts of a three-dimensional frequency space constituted by a horizontal frequency axis $\mu$, a perpendicular frequency axis $\nu$ and a time frequency axis f, which correspond to the x axis, the y axis and the t axis, respectively. FIG. 5(A) shows the three-dimensional space viewed obliquely, FIG. 5(B) shows the three-dimensional space viewed from the negative direction of the f axis, and FIG. 5(C) shows the three-dimensional space viewed from the positive direction of the $\mu$ axis.

FIGS. 5(A) to 5(C) also show a spectrum distribution of the V signal. As is obvious from FIGS. 5(A) to 5(C), the spectrum of the Y signal spreads around the original point of the three-dimensional frequency space. Since an I signal and a Q signal are modulated into orthogonal two phases at the frequency fsc of the chrominance subcarrier, the spectrum of the C signal is positioned at four spaces, as shown in FIGS. 5(A) to 5(C). When the V signal is observed on the $\mu$ axis, it only exists in the second quadrant and the fourth quadrant, as shown in FIG. 5(C). This corresponds to the fact that the solid line indicating the same phase of the chrominance subcarrier in FIG. 4(A) rises with the time.

In spite of this fact, in the conventional filter, when the movement of a picture is detected, YC separation utilizing the correlation in the field is carried out. Therefore, although it is possible to limit the band width in the directions of the $\mu$ axis and the $\nu$ axis, it is impossible to limit the band width in the direction of the f-axis. Consequently, the frequency space in which a Y signal naturally exists is separated as a C signal, so that the band width of the Y signal in a motion picture becomes narrow.

In contrast, in the present invention, it is possible to enlarge the band width of the Y signal by carrying out YC separation by an interfield processing.

In FIG. 4(B), the points in the (n−1) field which are in the vicinity of the principal sampling point ⊙ and at which the phase of the chrominance subcarrier is 180° different are the points (e), (f) and (g). The processing between the principal sampling point ⊙ and any of these three points enables interfield YC separation.

Figure 6A:
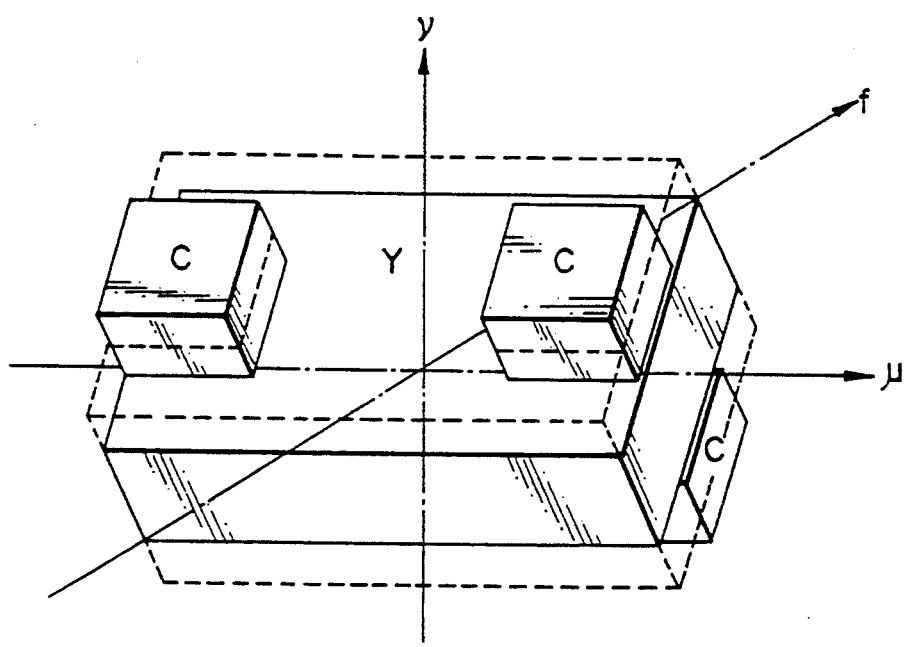
FIGS. 6(A), 6(B) and 6(C) show the spectrum distribution of a Y signal and a C signal obtained by a first interfield YC separation in a three-dimensional frequency space.
Figure 6B:
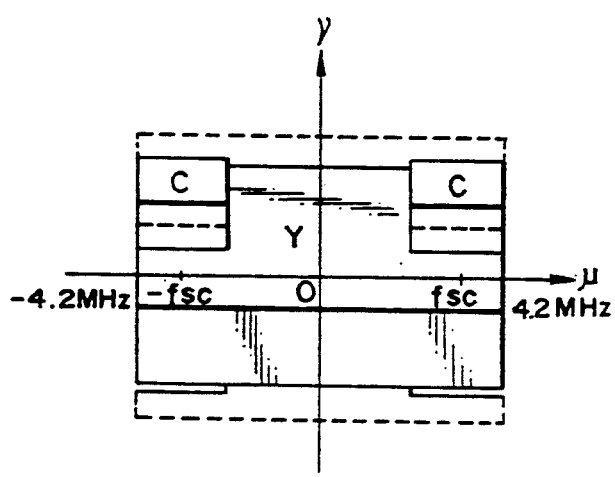
Figure 6C:
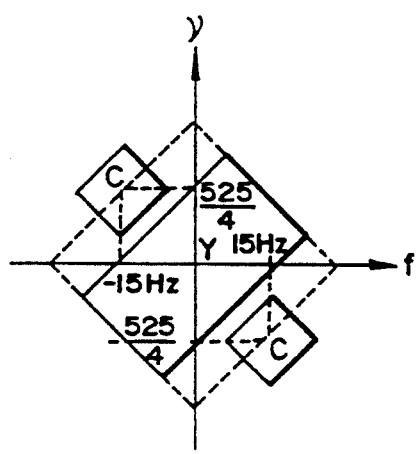

Firstly, YC separation by the processing of the principal sampling point ⊙ and the sampling point ● (e) in FIG. 4(B) will be described. The sum of these two sampling points produces a Y signal and the difference between these sampling points produces a C signal. FIGS. 6(A) to 6(C) show a three-dimensional frequency space in the same way as FIGS. 5(A) to 5(C). The frequency space in which the Y signal and the C signal obtained by the processing between the principal sampling point ⊙ and the sampling point (e) exist is shown.

Figure 7A:
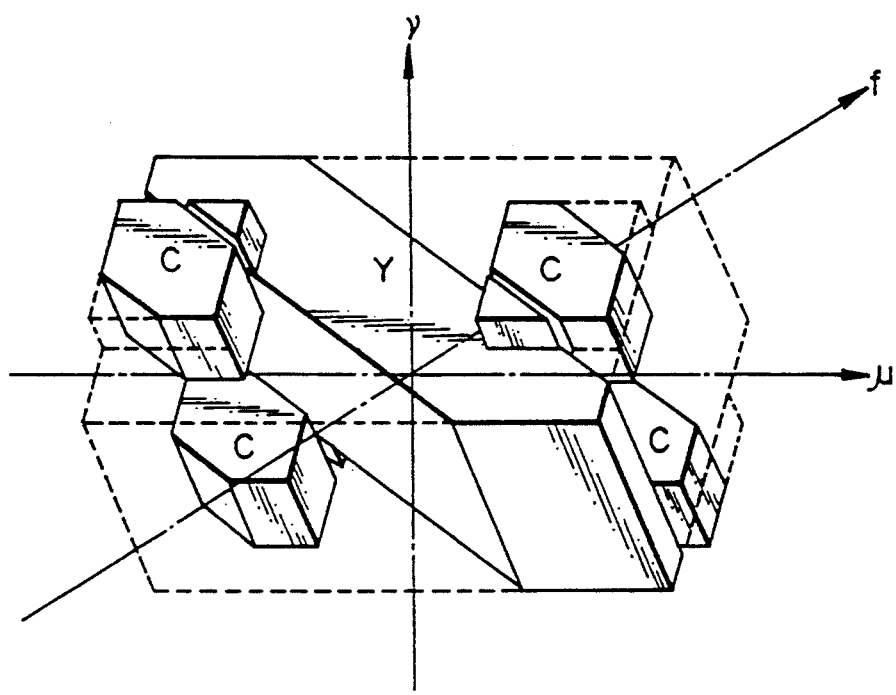
FIGS. 7(A), 7(B) and 7(C) show the spectrum distribution of a Y signal and a C signal obtained by a second interfield YC separation in a three-dimensional frequency space.
Figure 7B:
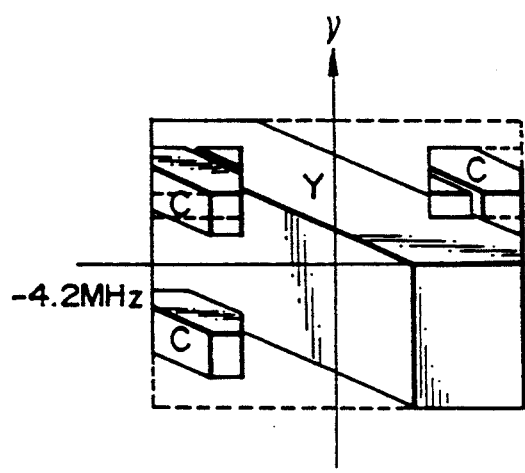
Figure 7C:
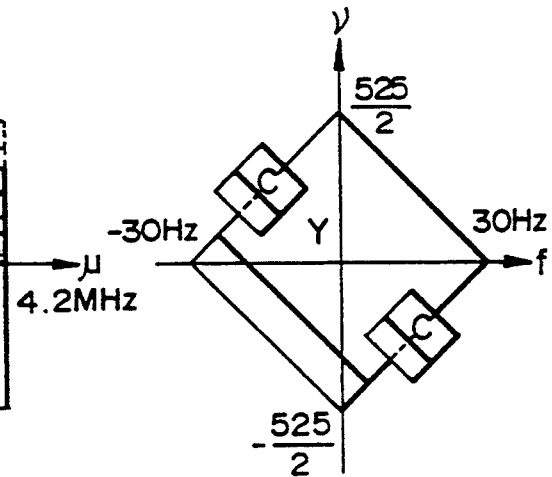

Secondly, YC separation by the processing of the principal sampling point ⊙ and the sampling point ● (f) in FIG. 4(B) will be described. The sum of these two sampling points produces a Y signal and the difference between these sampling points produces a C signal. FIGS. 7(A) to 7(C) show a three-dimensional frequency space in the same way as FIGS. 6(A) to 6(C). The frequency space in which the Y signal and the C signal obtained by the processing between the principal sampling point ⊙ and the sampling point (f) exist is shown. As is clear from FIGS. 7(A) to 7(C), a C signal is contained in a part of the separated Y signal, but since there is a strong correlation between a Y signal and a C signal, a C signal is scarcely contained in a Y signal.

Figure 8A:
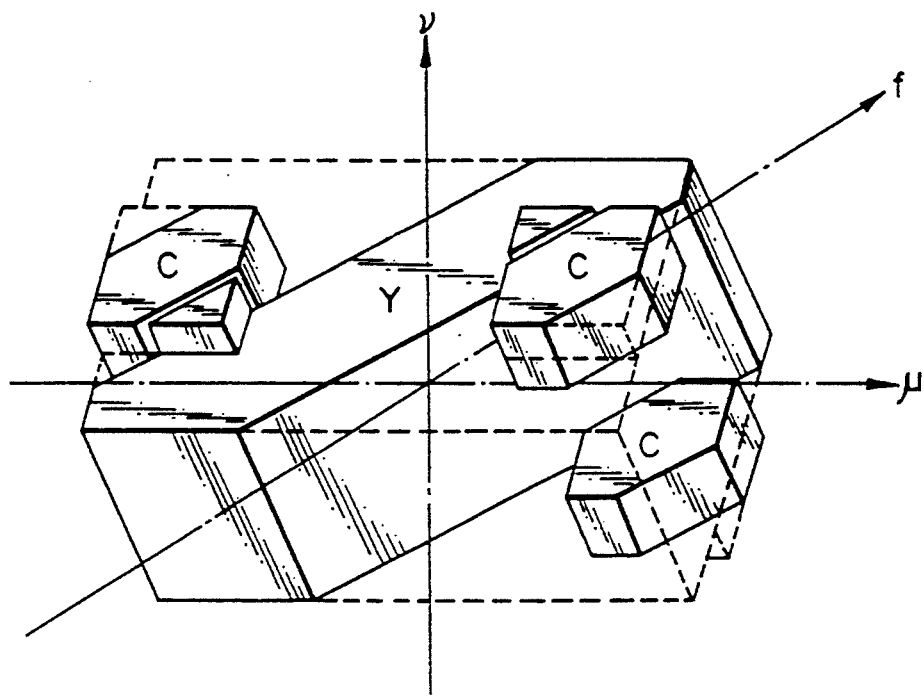
FIGS. 8(A), 8(B) and 8(C) show the spectrum distribution of a Y signal and a C signal obtained by a third interfield YC separation in a three-dimensional frequency space.
Figure 8B:
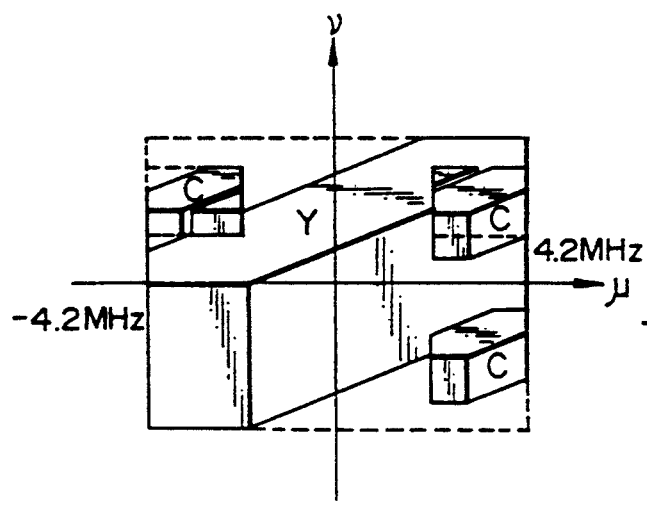
Figure 8C:
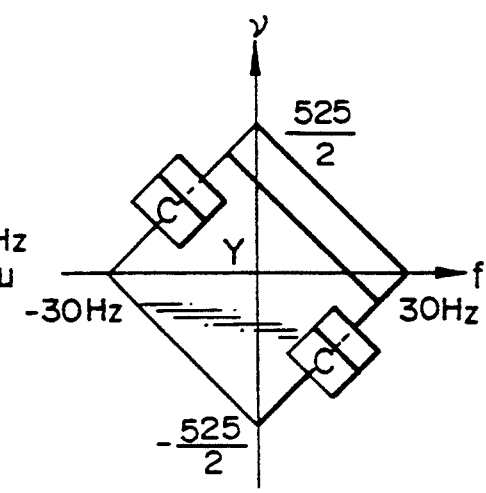

Thirdly, YC separation by the processing of the principal sampling point ⊙ and the sampling point ● (g) in FIG. 4(B) will be described. The sum of these two sampling points produces a Y signal and the difference between these sampling points produces a C signal. FIGS. 8(A) to 8(C) show a three-dimensional frequency space in the same way as FIGS. 5(A) to 7(C). The frequency space in which the Y signal and the C signal obtained by the processing between the principal sampling point ⊙ and the sampling point (g) exist is shown. As is clear from FIGS. 8(A) to 8(C), a C signal is contained in a part of the separated Y signal, but for the same reason as in FIGS. 7(A) to 7(C), a C signal is scarcely contained in a Y signal.

In order to carry out appropriate switching control among the above-described three kinds of interfield YC separations for the optimum interfield YC separation, it is necessary to detect the correlation between the principal sampling point and the sampling points ● (e), (f) and (g) in FIG. 4(B). Since it is the V signal which is digitally converted, the low-frequency component of a Y signal is taken out by passing each difference through the LPF in order to detect the correlation. In order to remove an isolated point, the correlative information data between the sampling points ● (h) and (j) in the same field and the sampling points ▲ (i) and the sampling point Δ (k) are compared and the correlative information of the principal sampling point ⊙ is corrected on the basis of the comparison.

It is the inframe YC separating circuit 53 shown in FIG. 2 that realizes the above-described fundamental principle of motion adaptive YC separation. The operation of the inframe YC separating circuit 53 will now be explained.

In FIG. 2, the V signal 101 input from the input terminal 11 is delayed by two pixels by the 2D delay circuit 14, and delayed by 262 lines by the 262H delay circuit 15.

The V signal 101 delayed by two pixels by the 2D delay circuit 14 is further subjected to infield YC separation based on the sum of the principal sampling point ⊙ and the sampling point (a) in FIG. 4(B) by the 1H delay circuit 17 and the adder 21, whereby a Y signal is output.

The output of the 262H delay circuit 15 is delayed by two pixels by the 2D delay circuit 18 and added to the output of the 2D delay circuit 14 by the adder 22, thereby being subjected to a first interfield YC separation based on the sum of the principal sampling point ⊙ and the sampling point (e) in FIG. 4(B), whereby a Y signal is output.

The output of the 262H delay circuit 15 is also input to the 1H delay circuit 16, and further delayed by two pixels by the 2D delay circuits 18 and 19, respectively, whereby a signal delayed by four pixels is output.

The output of the 2D delay circuit 19 and the output of the 2D delay circuit 14 are added to each other by the adder 23, thereby being subjected to a second interfield YC separation based on the sum of the principal sampling point ⓒ and the sampling point (f) in FIG. 4(B), whereby a Y signal is output.

The output of the 1H delay circuit 16 is input to the 2D delay circuit 20 and the output of the 2D delay circuit 20 is added to the output of the 2D delay circuit 14 by the adder 24, thereby being subjected to a third interfield YC separation based on the sum of the principal sampling point ⓒ and the sampling point (g) in FIG. 4(B), whereby a Y signal is output.

The Y signals output by the above-described four kinds of YC separations (one infield YC separation and three interfield YC separations) are input to the signal selecting circuit 38 and one of these four Y signals is selected by the output of the isolated point removing circuit 41, as will be described later.

The output of the 1H delay circuit 17 is subtracted from the output of the 2D delay circuit 14 by the subtracter 25, and the difference is passed through the LPF 29 which allows the band-pass of not more than 2.1 MHz and converted to an absolute value by the ABS 33. The absolute value is input to the MIN 37 so as to detect the correlation between the principal sampling point ⓒ and the sampling point (a) in FIG. 4(B).

The output of the 262H delay circuit 15 is subtracted from the output of the 2D delay circuit 14 by the subtracter 26, and the difference is passed through the LPF 30 which allows the band-pass of not more than 2.1 MHz and converted to an absolute value by the ABS 34. The absolute value is input to the MIN 37 so as to detect the correlation between the principal sampling point ⓒ and the sampling point (e) in FIG. 4(B).

The output of the 2D delay circuit 19 is subtracted from the output of the 2D delay circuit 14 by the subtracter 27, and the difference is passed through the LPF 31 which allows the band-pass of not more than 2.1 MHz and converted to an absolute value by the ABS 35. The absolute value is input to the MIN 37 so as to detect the correlation between the principal sampling point ⓒ and the sampling point (f) in FIG. 4(B).

The output of the 2D delay circuit 20 is subtracted from the output of the 2D delay circuit 14 by the subtracter 28, and the difference is passed through the LPF 32 which allows the band-pass of not more than 2.1 MHz and converted to an absolute value by the ABS 36. The absolute value is input to the MIN 37 so as to detect the correlation between the principal sampling point ⓒ and the sampling point (g) in FIG. 4(B).

The MIN 37 then selects the minimum of the four absolute value outputs, namely, the maximum amount of correlation detected, and outputs a correlation detecting signal indicating which filter should be selected. Thus, it is possible to select the optimum YC separating filter from the four kinds of YC separating filters.

In this embodiment, the result of detection is corrected by the isolated point removing circuit 41. The signal selecting circuit 38 selects the output of the filter which has the largest correlation, and outputs the thus-selected output as the inframe separated Y signal 112.

The 2D delay circuit 39 delays the V signal 101 by two pixels for the purpose of compensating for the delay. The subtracter 40 subtracts the inframe separated Y signal from the delayed signal, thereby outputting the inframe separated C signal 113.

The operation of the isolated point removing circuit 41 will now be explained.

In FIG. 3, a correlation detecting signal at the point (k) and a correlation detecting signal at the point (i) in FIG. 4(C) which are respectively output one line behind and one line and two pixels behind the correlation detecting signal 114 input from the terminal 42 are input to the first comparator 49. A correlation detecting signal, which shows which filter should be adopted, indicates the direction of the correlation of the picture which is being subjected to YC separation. The direction of correlation at the principal sampling point should be the same as the direction of correlation around the principal sampling point. Therefore, if the direction of correlation of the sampling point (k) and the direction of correlation of the sampling point (i) are the same, the first comparator 49 judges that the direction of correlation of the principal sampling point is also the same, and corrects the result of detection of correlation of the principal sampling point. In other words, the correlation detecting signal at the principal sampling point is corrected to the same correlation detecting signal as the correlation detecting signals at the points (k) and (i).

A correlation detecting signal at the point (h) and a correlation detecting signal at the point (j) in FIG. 4(C) which are respectively output one pixel and two lines behind and one pixel behind the correlation detecting signal 114 are input to the second comparator 50. If the direction of correlation of the sampling point (h) and the direction of correlation of the sampling point (j) are the same, the second comparator 50 judges that the direction of correlation of the principal sampling point is also the same, and corrects the result of detection of correlation of the principal sampling point.

The selecting circuit 51 is so controlled as to output the result of detection of correlation of the principal sampling point as it is when no correction is carried out by either of the first and second comparators 49 and 50. The selecting circuit 51 is also so controlled that one of the two corrections takes preference over the other when both comparators 49 and 50 have executed corrections, and the result is output.

Figure 9:
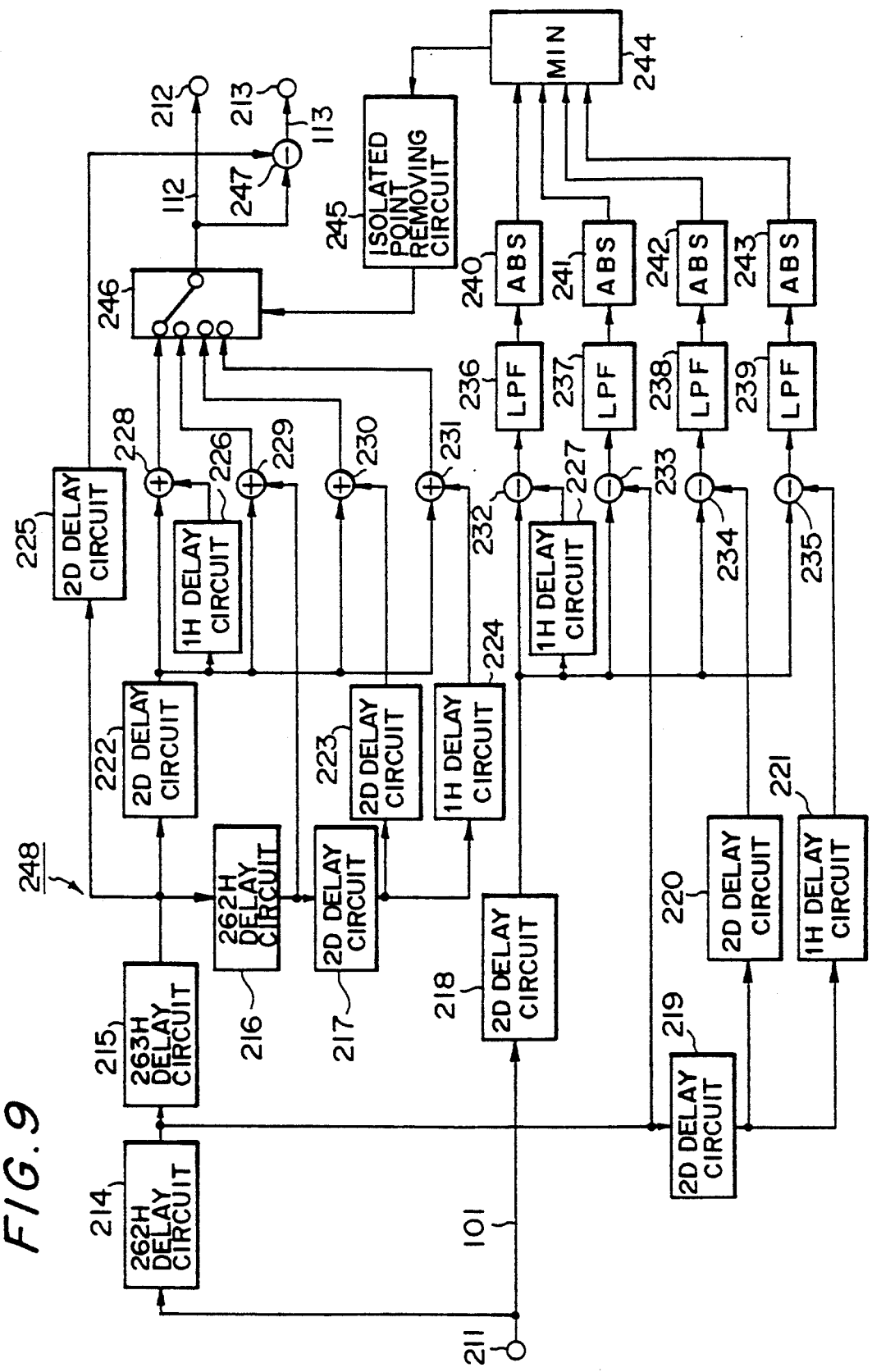
FIG. 9 is a block diagram of the detailed structure of an inframe YC separating circuit of another embodiment of a motion adaptive YC separation filter according to the present invention.

FIG. 9 is a block diagram of the detailed structure of an inframe YC separating circuit 248 of another embodiment of a motion adaptive YC separation filter according to the present invention. In FIG. 9, the V signal 101 is input to an input terminal 211. The inframe YC separating circuit 248 is provided with 262H delay circuits 214 and 216, a 263H delay circuit 215 for compensating a delay, two-pixel delay circuits (hereinunder referred to as "2D delay circuit") 217, 218, 219, 220, 222, 223 and 225, and 1-line delay circuits (hereinunder referred to as "1H-delay circuit") 221, 224, 226 and 227.

The reference numerals 228, 229, 230 and 231 represent adders, 232, 233, 234, 235 and 247 subtracters, 236, 237, 238 and 239 LPF's, 240, 241, 242 and 243 absolute circuits (hereinunder referred to as "ABS"), 244 a minimum value selecting circuit (hereinunder referred to as "MIN"), 245 an isolated point removing circuit, and 246 a signal selecting circuit. The output of the signal selecting circuit 246 is output from an output terminal 212 as the inframe separated Y signal 112, and the output of the subtracter 247 is output from an output terminal 213 as the inframe separated C signal 113.

Figure 10:
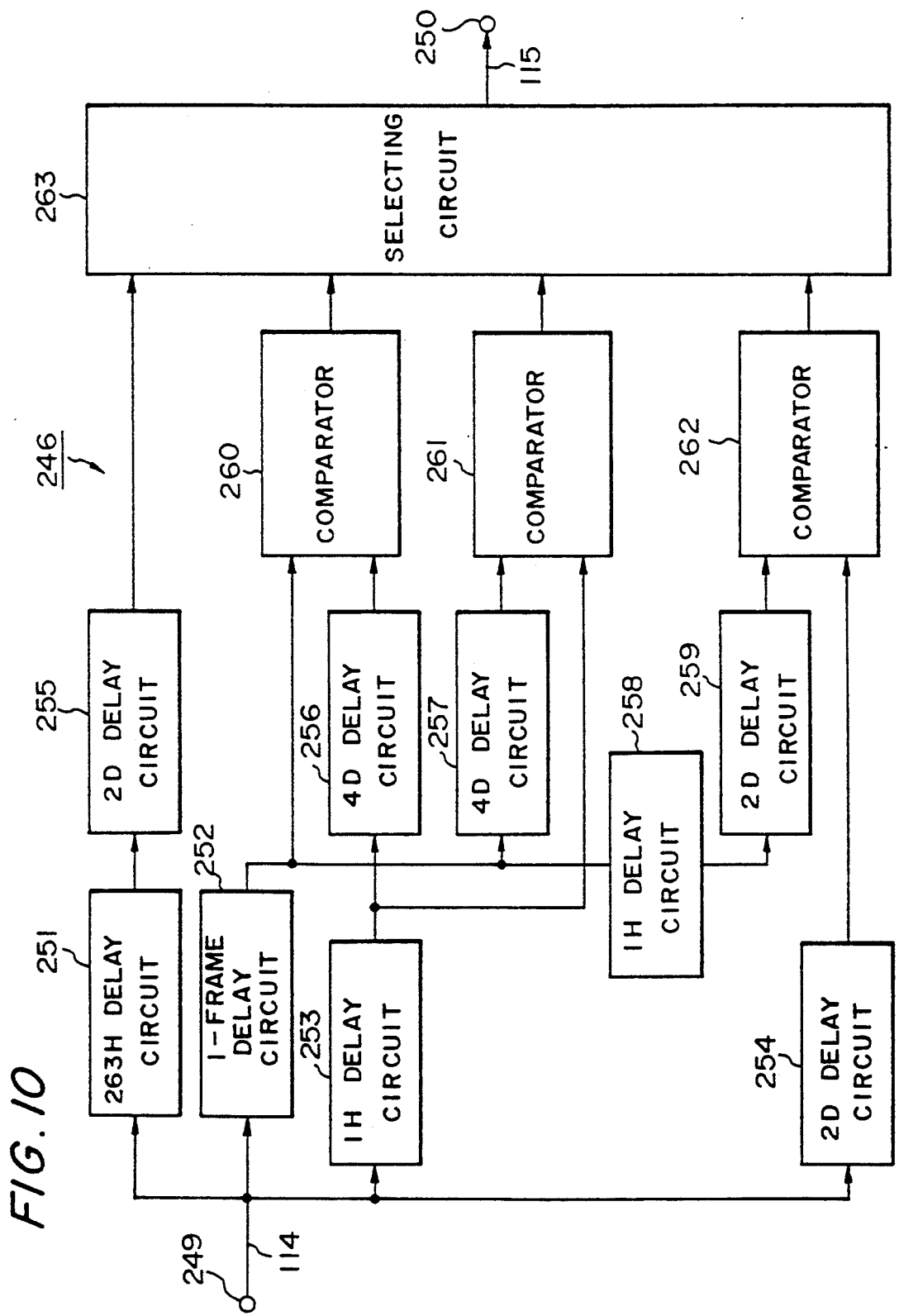
FIG. 10 is a block diagram of the detailed structure of an isolated point removing circuit of the embodiment shown in FIG. 9.

FIG. 10 is a block diagram of the detailed structure of the isolated point removing circuit 245. In FIG. 10, the reference numeral 249 denotes an input terminal of the correlation detecting signal 114 and the Correlation detecting signal 114 input therein is input to a 263H delay circuit 251, 1-frame delay circuit 252, 1H delay circuit 253 and 2D delay circuit 254. The output of the 263H delay circuit 251 is input to a 2D delay circuit 255 and the output of the 1-frame delay circuit 252 is input to a comparator 260, 4-pixel delay circuit (hereinunder referred to as "4D delay circuit") 257 and 1H delay circuit 258.

The output of the 1H delay circuit 253 is input to a 4D delay circuit 256 and a comparator 261, and the output of the 2D delay circuit 254 is input to the comparator 262. The output of the 4D delay circuit 256 is input to the comparator 260, while the output of the 4D delay circuit 257 is put to the comparator 261.

The output of the 2D-delay circuit 258 is input to a 1H delay circuit 259 and the output of the 2D delay circuit 259 is input to the comparator 262. The output of the 2D delay circuit 255 and the outputs of the comparators 260, 261 and 262 are input to a selecting circuit 263, the selecting circuit 263 outputting the control signal 115 to an output terminal 250.

The fundamental principle and the operation of this embodiment as a whole are the same as those of the first embodiment.

In FIG. 9, the V signal 101 input from the input terminal 211 is delayed by 262 lines by the 262H delaying circuit 214 and delayed by 2 pixels by the 2D delaying circuit 218. The V signal delayed by the 262H delaying circuit 214 is compensated for the delay by the 263H delaying circuit 215.

The V signal thus compensated for the delay is further delayed by the 2D delaying circuit 222 and the 262H delaying circuit 216. The output of the 2D delaying circuit 222 is added to the output of the 1H delaying circuit 226 by the adder 228, thereby being subjected to infield YC separation based on the sum of the principal sampling point ⓞ and the sampling point (a) in FIG. 11 (B), whereby a Y signal is output.

Figure 11A:
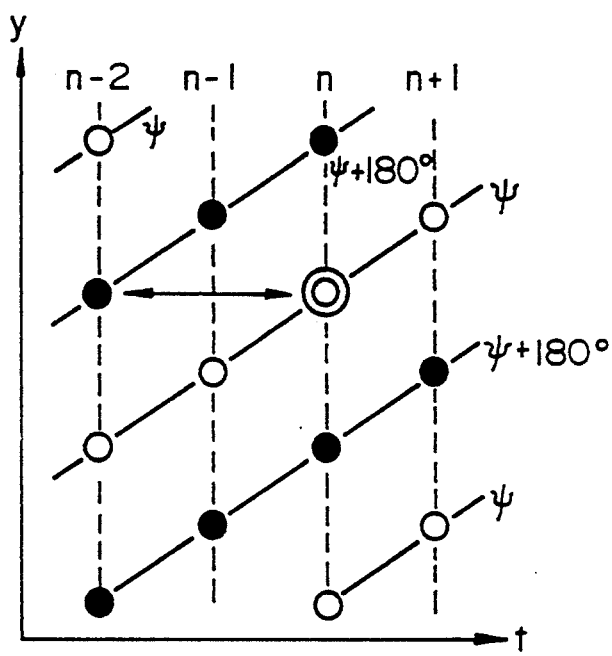
FIGS. 11(A), 11(B) and 11(C) show the arrangement of a V signal digitally converted at a frequency four times as high as that of a chrominance subcarrier in a three-dimensional time space.
Figure 11B:
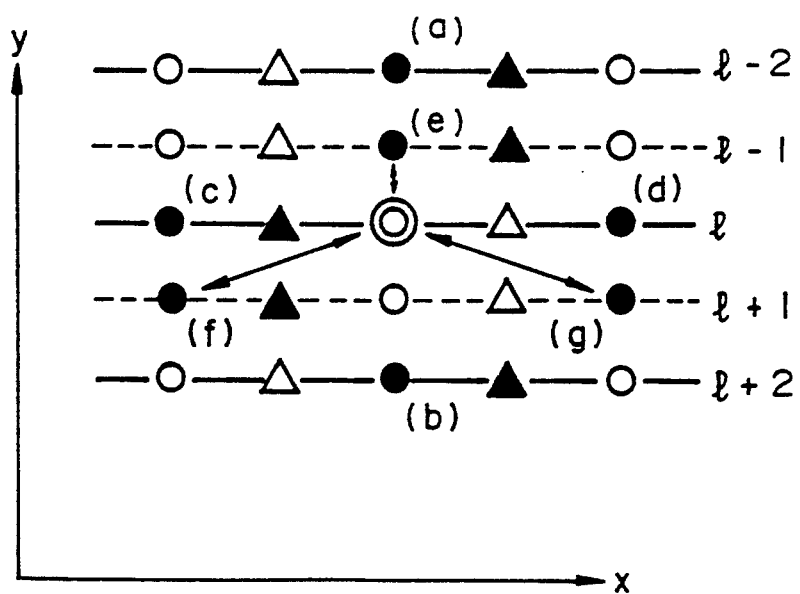

The output of the 262H delay circuit 216 is added to the output of the 2D delay circuit 222 by the adder 229, thereby being subjected to a first interfield YC separation based on the sum of the principal sampling point ⓞ and the sampling point (g) in FIG. 11(B), whereby a Y signal is output. The output of the 262H delay circuit 216 is also input to the 2D delay circuit 217, and further delayed by two pixels by the 2D delay circuit 223, whereby a signal delayed by four pixels is output.

The output of the 2D delay circuit 222 and the output of the 2D delay circuit 223 are added to each other by the adder 230, thereby being subjected to a second interfield YC separation based on the sum of the principal sampling point O and the sampling point (f) in FIG. 11 (B), whereby a Y signal is output.

The output of the 1H delay circuit 224 is added to the output of the 2D delay circuit 222 by the adder 231, thereby being subjected to a third interfield YC separation, whereby a Y signal is output.

The Y signals output by the above-described four kinds of YC separations in the same way as in the first embodiment are input to the signal selecting circuit 246 and one of these four Y signals is selected by the output of the isolated point removing circuit 245, as will be described later.

The output of the 1H delay circuit 227 is subtracted from the output of the 2D delay circuit 218 by the subtracter 232, and the difference is passed through the LPF 236 which allows the band-pass of not more than 2.1 MHz and converted to an absolute value by the ABS 240. The absolute value is input to the MIN 244 so as to detect the correlation between the principal sampling point ⓞ and the sampling point (a) in FIG. 11(B).

The output of the 2D delay circuit 218 is subtracted from the output of the 262H delay circuit 214 by the subtracter 233, and the difference is passed through the LPF 237 which allows the band-pass of not more than 2.1 MHz and converted to an absolute value by the ABS 241. The absolute value is input to the MIN 244 so as to detect the correlation between the principal sampling point ⓞ and the sampling point (e) in FIG. 11(B).

The output of the 2D delay circuit 220 is subtracted from the output of the 2D delay circuit 218 by the subtracter 234, and the difference is passed through the LPF 238 which allows the band-pass of not more than 2.1 MHz and converted to an absolute value by the ABS 242. The absolute value is input to the MIN 244 so as to detect the correlation between the principal sampling point ⓞ and the sampling point (f) in FIG. 11(B).

The output of the 1H delay circuit 221 is subtracted from the output of the 2D delay circuit 218 by the subtracter 235, and the difference is passed through the LPF 239 which allows the band-pass of not more than 2.1 MHz and converted to an absolute value by the ABS 243. The absolute value is input to the MIN 244 so as to detect the correlation between the principal sampling point ⓞ and the sampling point (e) in FIG. 11(B).

The MIN 244 then selects the minimum of the four absolute value outputs, namely, the maximum amount of correlation detected, and the result is output as a correlation detecting signal.

The isolated point removing circuit 245 selects the output of the filter which has the largest correlation from the result of judgment of correlation after an isolated point is removed, and outputs the thus-selected output as the inframe separated Y signal 112.

The 2D delay circuit 225 delays the output of 263H delay circuit 215 by two pixels for the purpose of compensating for the delay. The subtracter 247 subtracts the inframe separated Y signal from the delayed signal, thereby outputting the inframe separated C signal 113.

The operation of the isolated point removing circuit 245 will now be explained with reference to FIGS. 11(A) to 11(C).

Figure 11C:
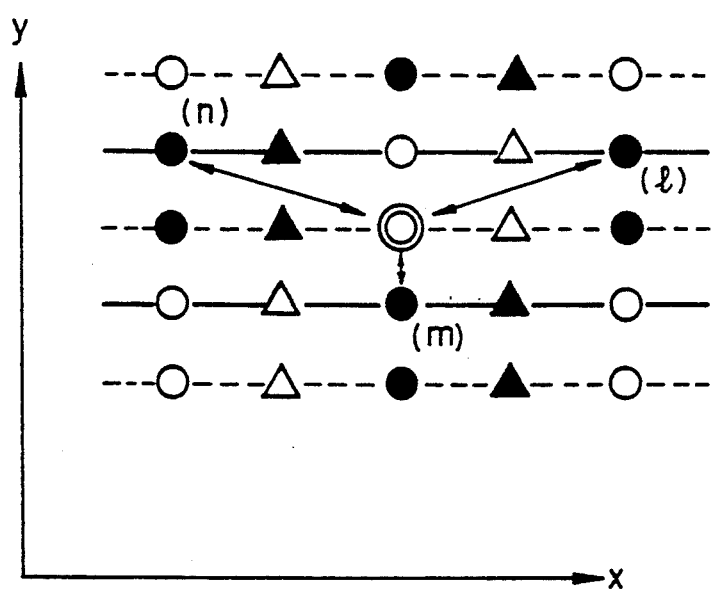

In FIG. 10, a correlation detecting signal at the point (l) in the (n−2) field in FIG. 11(C) which is output one frame behind the correlation detecting signal 114 input from the terminal 249 and a correlation detecting signal at the point (f) in FIG. 11(B) which is output one line and four pixels behind the correlation detecting signal 114 are input to the comparator 260 so as to compare the directions of correlation of the two signals. If the direction of correlation of the sampling point (f) is left-hand downward in FIG. 11(B) and the sampling point (f) has correlation with a sampling point in the (n−2) field and the sampling point (l) has correlation with the principal sampling point in the n field, the comparator 260 judges that the principal sampling point in the n field has correlation with the sampling point (f) in the (n—1) field and corrects the result of detection of correlation of the principal sampling point.

A correlation detecting signal at the point (n) which is output one frame and four pixels behind the correlation detecting signal 114 and a correlation detecting signal at the point (g) which is output one line behind the correlation detecting signal 114 are input to the comparator 261. If the direction of correlation of the sampling point (g) is right-hand downward in FIG. 11(B) and the sampling point (g) has correlation with a sampling point in the (n—2) field and the sampling point (n) has correlation with the principal sampling point in the n field, the comparator 261 judges that the principal sampling point in the n field has correlation with the sampling point (g) in the (n—1) field and corrects the result of detection of correlation of the principal sampling point.

A correlation detecting signal at the point (m) which is output one frame, one line and two pixels behind the correlation detecting signal 114 and a correlation detecting signal at the point (e) which is output two pixels behind the correlation detecting signal 114 are input to the comparator 262. If the direction of correlation of the sampling point (e) is right above in FIG. 11(B) and the sampling point (e) has correlation with a sampling point in the (n—2) field and the sampling point (m) has correlation with the principal sampling point in the n field, the comparator 262 judges that the principal sampling point in the n field has correlation with the sampling point (e) in the (n—1) field and corrects the result of detection of correlation of the principal sampling point.

The selecting circuit 263 is so controlled as to output the result of detection of correlation of the principal sampling point as it is when no correction is carried out by any of the comparators 260 to 262. The selecting circuit 263 is also controlled so that one correction takes preference over the others when two comparators or more have executed corrections, and the result is output.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A motion adaptive luminance signal and color signal separating filter for separating a color signal and a luminance signal from a color television signal in which the frequency of the color signal is multiplexed in the frequency of the luminance signal in accordance with an inframe signal in response to the movement of a picture, said motion adaptive luminance signal and color signal separating filter comprising:

an interfield luminance signal and color signal separating means for separating the luminance signal and the color signal by utilizing interfield correlation; and an infield luminance signal and color signal separating means for separating the luminance signal and the color signal by utilizing infield correlation.

2. The motion adaptive luminance signal and color signal separating filter according to claim 1, wherein said interfield luminance signal and color signal separating means includes a horizontal correlation luminance signal and color signal separating circuit and a plurality of interfield luminance signal and color signal separating circuits, and the motion adaptive luminance signal and color signal separating filter further comprising:

selecting means for selecting either an output from said infield correlation luminance signal and color signal separating means or an output from said interfield luminance signal and color signal separating means and for outputting the selected output;

said plurality of said interfield luminance signal and color signal separating circuits separating said luminance signal and said color signal by the processings of the signal of a principal pixel, which is an object of processing, and the signals of pixels different form each other.

3. The motion adaptive luminance signal and color signal separating filter according to claim 2, wherein said selecting means determines which output should be selected by a degree of the correlation between a signal of said principal pixel and a signal of the different pixels which are processed therewith.

4. The motion adaptive luminance signal and color signal separating filter according to claim 3, further comprising:

isolated point removing means for correcting a result for said principal pixel selected by said selecting means by comparing a result for said principal pixel selected by said selecting means and a result for a plurality of pixels in a vicinity of said principal pixel in a same field as a field of said principal pixel.

5. The motion adaptive luminance signal and color signal separating filter according to claim 3, further comprising:

isolated point removing means for correcting a result for said principal pixel selected by said selecting means by comparing a result for said principal pixel selected by said selecting means and a result for a plurality of pixels in a vicinity of said principal pixel in a different field from a field of said principal pixel.

6. A method of separating a color signal and a luminance signal from a color television signal in which the frequency of the color signal is multiplexed in the frequency of the luminance signal in response to movement in a picture, the method comprising the steps of:

(a) separating and subsequently outputting the separated luminance signal and the color signal by utilizing interframe correlation;

(b) separating inframe luminance signal and color signal by utilizing interfield correlation;

(c) mixing the outputted separated luminance and color signals of steps (a) and (b);

(d) detecting movement in the picture; and (e) varying a mixing ratio of the outputted separated luminance and color signals of steps (a) and (b) in accordance with the detected movement of step (d) to produce a motion adaptive separated luminance and chrominance signal.

7. The method as claimed in claim 6, wherein said step (d) includes detecting local movement in the picture by utilizing interframe correlation.

8. The method as claimed in claim 6, wherein said step (c) comprises the substeps of:

(c1) mixing the separated luminance signals of steps (a) and (b); and (c2) mixing the separated color signals of steps (a) and (b).

9. A circuit for separating a chrominance signal and a luminance signal from a color television signal in which the frequency of the chrominance signal is multiplexed in the frequency of the luminance signal in response to movement in a picture comprising:

interframe separating means for separating the luminance signal and the chrominance signal by utilizing interframe correlation;

separating means for separating inframe luminance signal and chrominance signal by utilizing interfield correlation;

mixing means for mixing the separated luminance and chrominance signals produced by said interframe separating means and said interfield separating means;

detection means for detecting movement in the picture; and mixing control means for varying a mixing ratio of the separated luminance and chrominance signals in said mixing means in accordance with the detected movement, thereby producing a motion adaptive separated luminance and chrominance signal.

10. The circuit as claimed in claim 9, wherein said detection means detects local movement in the picture by utilizing interframe correlation.

11. The circuit as claimed in claim 9, wherein said mixing means comprises:

first mixing means for mixing the separated luminance signals; and second mixing means for mixing the separated chrominance signals.

12. A device for producing a luminance signal from a composite color signal comprising:

separating means for separating a plurality of luminance signals from the composite color signal, each luminance signal being produced from a composite color signal from a first field in a first frame and a composite color signal from a second field in said first frame; and selecting means for selecting one of the separated luminance signals based on an interfield correlation, thereby producing the luminance signal.

13. The device as claimed in claim 12 wherein said interfield correlation is an inframe correlation.

14. The device as claimed in claim 12 wherein said separating means mathematically sums a composite color signal of an objective sample point in a first field and one of a plurality of composite color signals of sample points located proximate to the objective sample point in a second field to produce a luminance signal by interfield processing of the composite color signal.

15. A device for producing a luminance signal from a composite color signal comprising:

first separating means for generating three distinct interfield separated luminance signals from the composite color signal, each separated luminance signal being derived from a composite color signal of a first field and a composite color signal of a second field, and for outputting said three distinct interfield separated luminance signals;

second separating means for generating an infield separated luminance signal, said infield separated luminance signal being derived from a first composite color signal of said first field and a second composite color signal of said first field, and for outputting said infield separated luminance signal; and selecting means, operatively connected to said first and second separating means, for evaluating a correlation relationship between sample points in different fields and for selecting either one of the said three distinct interfield separated luminance signals or said infield separated luminance signal in accordance with the correlation evaluation.

16. The device as claimed in claim 15 wherein said first separating means mathematically sums a composite color signal of an objective sample point in a first field and one of a plurality of composite color signals of sample points located proximate to the objective sample point in a second field to provide interfield processing of the composite color signal.

17. A device for producing a luminance and chrominance signal from a composite color signal comprising:

separating means for separating a plurality of first signals from the composite color signal by using both a color composite signal from a first field in a first frame and a color composite signal from a second field in said first frame to produce each of said first signals;

a selector, operatively connected to said separating means and selecting one of said plurality of first signals; and subtracting means, operatively connected to said selector, for subtracting the selected separated said first signal from the composite color signal to produce the luminance and chrominance signals.

18. The device as claimed in claim 17 wherein said first signal is a luminance signal.

19. The device as claimed in claim 17 wherein said first signal is a chrominance signal.

20. The device as claimed in claim 18 wherein said separating means mathematically sums a composite color signal of an objective sample point in the first field and one of a plurality of composite color signals of sample points located proximate to the objective sample point in the second field to provide interfield processing of the composite color signal.

21. The device as claimed in claim 15 further comprising:

subtracting means, operatively connected to said selecting means, for subtracting the selected signal from the color composite signal to produce a chrominance signal.

22. The device as claimed in claim 21 wherein said first separating means mathematically sums a composite color signal of an objective sample point in the first field and one of a plurality of composite color signals of sample points located proximate to the objective sample point in the second field to provide interfield processing of the composite color signal.

23. A method for producing a luminance signal from a composite color signal comprising the steps of:

(a) separating a plurality of luminance signals from the composite color signal, each luminance signal being produced from a composite color signal from a first field in a first frame and a composite color signal from a second field in the first frame; and (b) selecting one of the separated luminance signals based on an interfield correlation, thereby producing the luminance signal.

24. The method as claimed in claim 23 wherein said step (a) mathematically sums a composite color signal of an objective sample point in the first field and one of a plurality of composite color signals of sample points located proximate to the objective sample point in the second field to provide interfield processing of the composite color signal.

25. A method for producing a luminance signal from a composite color signal comprising the steps of:
   (a) generating three distinct interfield separated luminance signals from the composite color signal, each interfield separated luminance signal being derived from a composite color signal of a first field and a composite color signal of a second field;
   (b) generating an infield separated luminance signal, the infield separated luminance signal being derived from a first composite color signal of the first field and a second composite color signal of the first field;
   (c) evaluating a correlation relationship between points in different fields; and
   (d) selecting either one of the three distinct interfield separated luminance signals or the infield separated luminance signal in accordance with the correlation evaluation of said step (c).

26. The method as claimed in claim 25 wherein said step (a) mathematically sums a composite color signal of an objective sample point in the first field and one of a plurality of composite color signals of sample points located proximate to the objective sample point in the second field to provide interfield processing of the composite color signal.

27. A system for producing a luminance and chrominance signal from a composite color signal comprising:
   separating means for separating a luminance signal and a chrominance signal from the composite color signal by using a composite signal from a first field in a first frame and a composite signal from a second field in said first frame;
   motion detecting means for detecting motion in the composite color signal based on interframe correlation;
   interframe correlation luminance and chrominance signal separation means for separating the luminance and chrominance signals based on the interframe correlation; and
   mixing means for receiving more of an output of said separating means if the motion detected by said motion detecting means is relatively large and for receiving more of an output of said interframe correlation luminance and chrominance signal separating means if the motion detected by said motion detecting means is relatively small, whereby luminance and chrominance signals outputted from said separating means and interframe correlation luminance and chrominance signal separating means can be mixed.

28. The system as claimed in claim 27 wherein said separating means comprises:
   first means for generating three distinct interfield separated signals from the composite signal, each interfield separated signal being derived from a composite color signal of a fist field and a composite color signal of a second field, and for outputting said three distinct interfield separated signals;
   second means for generating an infield separated signal, said infield separated signal being derived from a first composite color signal of said first field a second composite color signal of said first field, and for outputting said infield separated signal;
   selecting means, operatively connected to said first and second separating means, for evaluating a correlation relationship between points in different fields and for selecting either one of said three distinct separated luminance signals or said infield separated signal in accordance with the correlation evaluation; and
   subtracting means, operatively connected to said selecting means, for subtracting the selected signal from the composite color signal to produce the luminance and chrominance signals;
   said mixing means receiving more of an output of said subtracting means if the motion detected by said motion detecting means is relatively large and for receiving more of an output of said interframe correlation luminance and chrominance signal separating means if the motion detected by said motion detecting means is relatively small, whereby luminance and chrominance signals outputted form said subtracting means and interframe correlation luminance and chrominance signal separating means can be mixed.

29. The system as claimed in claim 28 wherein said first signal is a luminance signal.

30. The system as claimed in claim 28 wherein said first signal is a chrominance signal.

31. A luminance and chrominance signal separating filter adaptive to a movement of an image, which separates luminance signals and chrominance signals from composite color television signals representing the image in which the chrominance signals are frequency-multiplexed within a high frequency region of the luminance signals, comprising:
   a motion detecting circuit which detects movement of an image utilizing a correlation between frames;
   an interframe separating circuit which performs a first separation of luminance and chrominance signals utilizing the interframe correlation when said motion detecting circuit detects a still image, and outputs interframe separated chrominance signals and interframe separated luminance signals;
   an inframe separating circuit to separate chrominance signals from the composite signal in a first field of a first frame by using composite signals from a second field of the first frame to develop a separated chrominance signal;
   a first signal mixing circuit which mixes the interframe separated chrominance signals and the inframe separated chrominance signals in accordance with an output of said motion detecting circuit and outputs motion adaptive separated chrominance signals; and
   a second signal mixing circuit which mixes the interframe separated luminance signals and the inframe separated luminance signals in accordance with the output of said motion detecting circuit and outputs motion adaptive separated luminance signals.

32. A luminance and chrominance signals separating filter adaptive to a movement of an image, which separates luminance signals and chrominance signals from composite color television signals representing the image in which the chrominance signals are frequency-multiplexed with a high frequency region of the luminance signals, comprising:
   a motion detecting circuit to partially detect movement of an image utilizing a correlation between frames;
   an interframe separating circuit which performs a first separation utilizing the interframe correlation when said motion detecting circuit detects a still image, and outputs interframe separated luminance signals and interframe separated chrominance signals;

a correlation detecting circuit to partially detect a correlation in a field or between fields when said motion detecting circuit detects a moving image;

an isolated point eliminating circuit which decides the correlation from the detected results of a selected pixel and nearby pixels in the neighborhood of the selected pixel when the detected result of the particular sapling pint is an isolated point;

an inframe separating circuit which selects an optimum process from a plurality of inframe processes including interfield operations in accordance with the decided correlation and outputs inframe separated chrominance signals and inframe separated luminance signals;

a first signal mixing circuit which mixes the interframe separated luminance signals and the inframe separated luminance signals in accordance with the output of said motion detecting circuit and outputs motion adaptive separated luminance signals; and a second signal mixing circuit which mixes the interframe separated chrominance signals and the inframe separated chrominance signals in accordance with the output of said motion detecting circuit and outputs motion adaptive separated chrominance signals.

33. The luminance and chrominance signals separating filter adaptive to a movement of an image in accordance with claim 32, wherein said isolated point eliminating circuit detects interfield correlations in differing direction by the comparison of selected pixel and neighboring pixels from the output of said correlation detecting circuit, and selects the direction of greater correlation to decide the interfield correlation at the particular sampling point.

34. A method of separating luminance and chrominance component signals from a composite color television signal defining sequential television frames adaptive to movement of an image represented thereby, the chrominance signals being frequency multiplexed within a high-pass frequency region of the luminance signals, comprising the steps of:

(a) determining, for each selected pixel and an image defied by the composite color television signal, a degree of correlation to at least two nearby pixels which extend in differing directions to determine a direction of greatest correlation, the direction of greatest correlation of the selected pixel being associated with one of the nearby pixels;

(b) eliminating isolated points by smoothing the direction of greatest correlation of each selected pixel with the directions of highest correlation of a group of adjacent pixels to produce an isolated point corrected direction of highest correlation for the selected pixel;

(c) combining the portion of the composite color television signal defining the selected nearby pixel associated with the isolated point corrected direction of highest correlation with the portion of the composite color television signal defining the selected pixel to develop a separated first signal associated with the selected pixel; and (d) subtracting the separated first signal from the composite color television signal to produce a chrominance signal and luminance signal, thereby developing both a luminance signal and a chrominance signal from the composite color television signal.

35. The method as claimed in claim 34 wherein the first signal is a chrominance signal.

36. The method as claimed in claim 34 wherein the first signal is a luminance signal.

37. The method as claimed in claim 35 wherein the nearby pixels used in said step (a) of determining are spatially nearby pixels in a different field of the image.

38. The method as claimed in claim 35 wherein the adjacent pixels used in said step (b) of eliminating isolated points are spatially nearby pixels in a different field of said image.

39. A luminance and chrominance signal separating filter for separating the luminance and chrominance component signals from a composite color television signal defining sequential television frames adaptive to movement of an image defined by the composite color television filter, the chrominance signals being frequency multiplexed with a high-pass frequency region of the luminance signals, comprising:

a correlation detector to determine, for each selected pixel of an image defined by the composite color television signal, a degree of correlation to at least tow nearby pixels which extend in differing directions to determine a direction of highest correlation, the direction of highest correlation of said selected pixel being associated with one of said nearby pixels;

an isolated point eliminator, response to said correlation detector, to eliminate isolated points by smoothing the direction of highest correlation of each said selected pixel with the directions of highest correlation of a group of adjacent pixels to produce an isolated point corrected direction of highest correlation for said selected pixel;

inframe processor means for combining the portion of the composite color television signal defining the selected nearby pixel associated with the isolated point corrected direction of highest correlation produced by said isolated point eliminator with the portion of the composite color television signal defining the selected pixel to develop a separated first signal associated with the selected pixel;

a subtractor to subtract the first signal from the composite color television signal to produce both a luminance signal and a chrominance signal from the composite color television signal.

40. The filter as claimed in claim 39 wherein said first signal is a chrominance signal.

41. The filter as claimed in claim 40 wherein said first signal is a luminance signal.

* * * * *